United States Patent [19]

Yada

[11] Patent Number: 5,526,200
[45] Date of Patent: Jun. 11, 1996

[54] CLOCK REPRODUCING APPARATUS AND DATA REPRODUCING APPARATUS UTILIZING WEIGHTING-ADDING OF SAMPLES

[75] Inventor: Hiroaki Yada, Kanagawa, Japan

[73] Assignee: Sony Corporation, Japan

[21] Appl. No.: 221,064

[22] Filed: Mar. 30, 1994

[30] Foreign Application Priority Data

Mar. 31, 1993 [JP] Japan .................................. 5-094983

[51] Int. Cl.⁶ ...................................................... G11B 5/09
[52] U.S. Cl. .................................... 360/51; 360/65
[58] Field of Search ........................... 360/46, 51, 65, 360/77.08; 331/17, 25; 327/5, 9, 291, 159

[56] References Cited

U.S. PATENT DOCUMENTS

| | | | |
|---|---|---|---|
| 5,216,554 | 6/1993 | Schneider | 360/51 |
| 5,282,185 | 1/1994 | Mori et al. | 369/48 |
| 5,311,178 | 5/1994 | Pan et al. | 360/46 |
| 5,327,298 | 7/1994 | Ottesen et al. | 360/46 |
| 5,341,249 | 8/1994 | Abbott et al. | 360/51 |
| 5,377,178 | 12/1994 | Saito et al. | 360/48 |
| 5,388,090 | 2/1995 | Hoshino et al. | 369/775.3 |
| 5,406,427 | 4/1995 | Shimoda | 360/51 |

FOREIGN PATENT DOCUMENTS

| | | | |
|---|---|---|---|
| 0438784A3 | 12/1990 | European Pat. Off. | G11B 20/14 |
| 2269727 | 2/1994 | United Kingdom | G11B 20/10 |

*Primary Examiner*—W. Chris Kim
*Attorney, Agent, or Firm*—Limbach & Limbach

[57] ABSTRACT

A clock reproducing apparatus is adapted for reproducing a data existing point clock signal by using a reproduction signal obtained from a magnetic disc on which clock patterns for clock reproduction are recorded in servo areas discretely provided independent of data recording area, which comprises: a voltage controlled oscillator operative to oscillate the data existing point clock signal; a sampling circuit for sampling the reproduction signal in synchronism with the data existing point clock signal; a phase information generator for weighting-adding plural sample values before and after a reference sample value corresponding to the peak of a reproduced isolated waveform of the clock pattern to thereby generate phase information indicating a phase difference between the data existing point clock signal and a reproduction signal of the clock pattern; and a control voltage converter for converting phase information generated by the phase information generator to a control voltage for controlling the voltage controlled oscillator. Moreover, the clock reproducing apparatus further comprises a phase synchronization loop control circuit adapted to generate a phase comparison timing signal for allowing a sample value after a predetermined data existing point clock time from occurrence time of a signal which detects a unique pattern for recognizing an approximate existing time of the clock pattern. In addition, when there is employed a configuration to detect data in synchronism with the data existing point clock signal, a data recording apparatus is provided.

23 Claims, 18 Drawing Sheets

CURVE 1 : Pk=Sk-1-Sk+1
CURVE 2 : Pk=Sk-2-Sk+2
CURVE 4 : Pk=Sk-4-Sk+4

$Pk = Sk-4 + 0.125 \cdot Sk+2 - Sk+4$

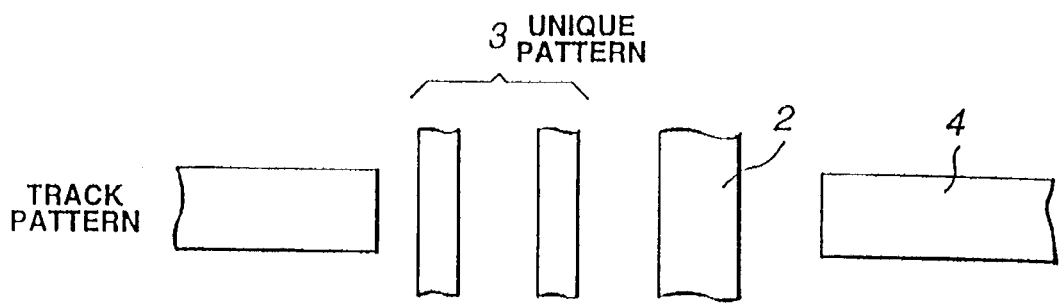
FIG. 10A
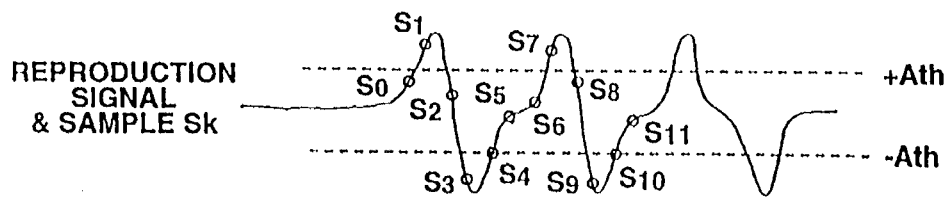
FIG. 10B
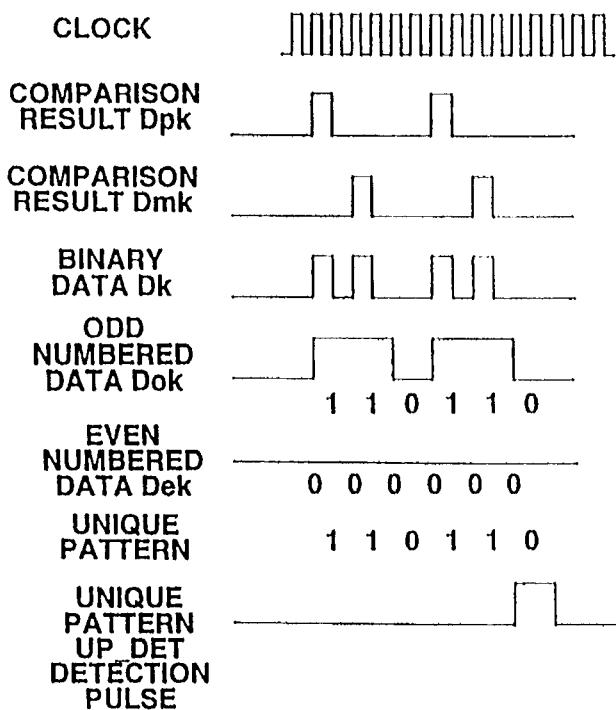
| | | |
|---|---|---|
| CLOCK | | FIG. 10C |
| COMPARISON RESULT Dpk | | FIG. 10D |
| COMPARISON RESULT Dmk | | FIG. 10E |
| BINARY DATA Dk | | FIG. 10F |
| ODD NUMBERED DATA Dok | 1 1 0 1 1 0 | FIG. 10G |
| EVEN NUMBERED DATA Dek | 0 0 0 0 0 0 | FIG. 10H |
| UNIQUE PATTERN | 1 1 0 1 1 0 | FIG. 10I |
| UNIQUE PATTERN UP_DET DETECTION PULSE | | FIG. 10J |

CLOCK REPRODUCING APPARATUS AND DATA REPRODUCING APPARATUS UTILIZING WEIGHTING-ADDING OF SAMPLES

BACKGROUND OF THE INVENTION

1. Field of the Invention

This invention relates to a clock reproducing apparatus and a data reproducing apparatus in a magnetic disc system such as a hard disc drive, etc.

2. Description of the Prior Art

An external clock type magnetic disc system is adapted to generate a clock signal synchronous with a data existing point which gives recording/reproduction timing of data on the basis of clock patterns discretely arranged at equal intervals on concentric or spiral recording tracks. Namely, by a phase synchronization loop (so called PLL) adapted to control the oscillating phase of a voltage controlled oscillator (VCO) based on phase error information obtained by detecting a peak existing time of a reproduced signal waveform of the above clock pattern by using a peak detector to sample and hold a saw-tooth wave at that time to carry out phase comparison thereof, a clock signal synchronous with the data existing point is reproduced.

In the conventional clock reproducing apparatus, since phase comparison is carried out on the basis of the clock pattern, a peak detector and a saw-tooth wave generator were used. These circuit elements are complicated analog signal processing circuits. Accordingly, so it was difficult to allow the circuit to become compact and/or to be adjustment-free. It was also difficult for such a clock reproducing circuit block to coexist with other circuit blocks within one LSI adapted for digital processing.

OBJECT AND SUMMARY OF THE INVENTION

With the above-mentioned drawbacks in view, an object of this invention is to provide a clock reproducing apparatus and a data reproducing apparatus which permit the circuit to be compact and adjustment-free, and to be digitally implemented with ease.

To achieve the above-described object, in accordance with one aspect of this invention, there is provided a clock reproducing apparatus adapted for reproducing a data existing point clock signal by using a reproduction signal obtained by a magnetic head from a magnetic disc on which clock patterns for reproduction of a clock are recorded in servo areas discretely provided independent of data recording areas, which comprises: voltage controlled oscillating means controlled by a control voltage to thereby oscillate the data existing point clock signal; sampling means for sampling the reproduction signal in synchronism with the data existing point clock signal; phase information generating means for weighting-adding a plurality of sample values before and after a reference sample value corresponding to a peak of a reproduced isolated waveform of the clock pattern from the sampling means to thereby generate phase information indicating a phase difference between the data existing point clock signal and a reproduction signal of the clock pattern; and control voltage converting means for converting phase information generated by the phase information generating means to a control voltage for controlling the voltage controlled oscillating means, the voltage controlled oscillating means being operative to output the data existing point clock signal corresponding to a control voltage obtained by the control voltage converting means.

Further, the clock reproducing apparatus may be such that a unique pattern for recognizing an approximate existing time of the clock pattern is provided in the servo area of the magnetic disc, and that there is further provided phase synchronization loop control means adapted to generate a phase comparison timing signal for allowing a sample value after a predetermined data existing point clock time from an occurrence time of a unique pattern detection signal indicating that the unique pattern has been detected.

The phase information generating means may weighting-add a plurality of sample values positioned symmetrically in point of time relative to the reference sample value to generate phase information.

The phase information generating means may switch the weighting coefficient in dependency upon whether the phase synchronization loop is in the synchronization capture state or in the lock state to generate the phase information.

The clock reproducing apparatus may be such that the phase synchronization loop control means detects whether or not the unique pattern detection signal is detected at equal clock intervals to thereby generate a state indication signal indicating whether or not the phase synchronization loop is in the lock state, and that the phase information generating means comprises a digital delay line with taps adapted to output a plurality of sample values for carrying out weighting, coefficient multiplying means corresponding to the number of the sample values, adding means for providing a sum total of respective outputs of the coefficient multiplying means, and coefficient supply means for delivering weighting coefficients corresponding to the state of the phase synchronization loop to the coefficient multiplying means in accordance with the state indication signal from the phase synchronization control means.

The clock reproducing apparatus may be such that the weighting coefficient is represented by power of 2 in digital form, and that the coefficient multiplying means carries out weighting by bit shift of the sample value in accordance with the coefficient represented by power of 2.

The clock reproducing apparatus may be such that the magnetic disc includes concentric or spiral tracks where data recording areas and servo areas at least including a clock pattern and a unique pattern are formed one after another, and further includes an arcuated servo region traversing the tracks, and that the magnetic head is rotationally driven by a rotary actuator so as to scan the arcuated servo region.

In accordance with another aspect of this invention, there is provided a data reproducing apparatus adapted to reproduce a data existing point clock signal by using a reproduction signal obtained by a magnetic head from a magnetic disc on which clock patterns for reproduction of clock and unique patterns for recognizing an approximate existing time of the clock pattern are recorded in servo areas discretely provided independent of data recording areas, thus to detect data in synchronism with the data existing point clock signal, which comprises: voltage controlled oscillating means controlled by a control voltage to thereby oscillate the data existing point clock; sampling means for sampling the reproduction signal in synchronism with the data existing point clock signal; reproduction information processing means for weighting-adding a plurality of sample values before and after a reference sample value corresponding to a peak of a reproduced isolated waveform of the clock pattern from the sampling means to thereby carry out, in a time-division manner, a phase information generating processing for generating phase information indicating a phase difference between the data existing point clock signal and a reproduction signal of the clock pattern and an equalizing processing for equalizing a reproduced waveform of data; and control voltage converting means for converting phase information generated by the reproduction information processing means to a control voltage for controlling the voltage controlled oscillating means, the voltage controlled oscillating means being operative to output the data existing point clock signal corresponding to a control voltage obtained by the control voltage converting means., In the data reproducing apparatus, the reproduction information processing means may carry out switching between the phase information generating processing and the equalizing processing in accordance with a processing timing signal indicating whether the reproduction signal from the magnetic disc is a reproduction signal with respect to the servo area where the clock pattern is recorded or a reproduction signal with respect to the data area where the data is recorded.

The data reproducing apparatus may further comprise phase synchronization loop control means for detecting whether or not a unique pattern detection signal indicating that the unique pattern has been detected is detected at equal clock intervals to thereby generate a state indication signal indicating whether or not the phase synchronization loop is in a lock state, wherein the reproduction information processing means comprises a digital delay line with taps for outputting a plurality of sample values for carrying out weighting or equalizing, coefficient multiplying means corresponding to the number of the sample values, adding means for providing a sum total of respective outputs of the coefficient multiplying means, and coefficient supply means for delivering, to the coefficient multiplying means, weighting coefficients and equalizing coefficients corresponding to the state of the phase synchronization loop in accordance with the state indication signal from the phase synchronization loop control means and the processing timing signal.

In the data reproducing apparatus, the equalizing coefficient may be a coefficient for carrying out equalization so as to satisfy the Nyquist first criterion.

In accordance with the clock reproducing apparatus thus constructed, in reproducing a data existing point clock signal by using a reproduction signal obtained by a magnetic head from a magnetic disc on which clock patterns for reproduction of clock are recorded in servo areas discretely provided independent of data recording areas, the reproduction signal is sampled, by using sampling means, in synchronism with the data existing point clock signal outputted from the voltage controlled oscillating means to weighting-add, by using phase information generating means, a plurality of sample values before and after a reference sample value corresponding to the peak of a reproduced isolated waveform of the clock pattern from the sampling means to thereby generate phase information indicating a phase difference between the data existing point clock signal and a reproduction signal of the clock pattern to convert, by using control voltage converting means, phase information generated by the phase information generating means to a control voltage for controlling the voltage controlled oscillating means, whereby the voltage controlled oscillating means outputs the data existing point clock signal corresponding to the control voltage obtained by the control voltage converting means.

In the case where a unique pattern for recognizing an approximate existing time of the clock pattern is provided in the servo area of the magnetic disc, phase synchronization loop control means generates a phase comparison timing signal for allowing a sample value after a predetermined data existing point clock time from the occurrence time of a unique pattern detection signal indicating that the unique pattern has been detected.

The phase information generating means weighting-adds a plurality of sample values positioned symmetrically in point of time relative to the reference sample value to generate phase information.

In generating the phase information, the weighting coefficients are switched by the phase information generating means in dependency upon whether the phase synchronization loop is in the synchronization capture state or in the lock state.

Whether or not the unique pattern detection signal is detected at equal clock intervals is detected by the phase synchronization loop control means to thereby generate a state indication signal indicating whether or not the phase synchronization loop is in lock state. A sum total of respective outputs of coefficients multiplying means corresponding to the number of a plurality of sample values for carrying out weighting outputted from the digital delay line with taps is taken by adding means to deliver, to the coefficient multiplying means, by using the coefficient multiplying means, weighting coefficients corresponding to the phase synchronization loop in accordance with the state indication signal from the phase synchronization loop control means.

In the case where the weighting coefficient is represented by a digital value of power of 2, the coefficient multiplying means carries out weighting by bit shift of the sample value in accordance with the coefficient of power of 2.

In addition, in the case where the magnetic disc includes concentrical or helical tracks where data recording areas and servo areas including clock patterns and unique patterns are formed one after another, and further includes arcuated servo region traversing the tracks, the magnetic head is rotationally driven by the rotary actuator so as to scan the arcuated servo area traversing the tracks.

Further, in accordance with the data reproducing apparatus constructed as above, in reproducing a data existing point clock signal by using a reproduction signal obtained by a magnetic head from a magnetic disc on which clock patterns for reproduction of clock and unique patterns for recognizing an approximate existing time of the clock pattern are recorded in servo areas discretely provided independent of data recording areas thus to detect data in synchronism with the data existing point clock signal, the reproduction signal is sampled, by using sampling means, in synchronism with the data existing point clock signal outputted from the voltage controlled oscillating means to weighting-add, by using reproduction information processing means, a plurality of sample values corresponding to the peak of a reproduced isolated waveform of the clock pattern from the sampling means to thereby carry out, in a time-divisional manner, phase information generating processing for generating phase information indicating the phase difference between the data existing point clock signal and the reproduction signal of the clock pattern signal and an equalizing processing for equalizing a reproduced waveform of data to convert, by using the control voltage converting means, phase information generated by the reproduction information processing means to a control voltage for controlling the voltage controlled oscillating means, whereby the voltage controlled oscillating means outputs the data existing point clock signal corresponding to the control voltage obtained by the control voltage converting means.

By the reproduction information processing means, switching between the phase information generating processing and the equalizing processing is carried out in accordance with a processing timing signal indicating whether the reproduction signal from the magnetic disc is a reproduction signal with respect to the servo area where the clock pattern is recorded or a reproduction signal with respect to the data area where the data is recorded.

Whether or not a unique pattern detection signal indicating that the unique pattern has been detected is detected at equal clock intervals is detected by the phase synchronization control means to thereby generate a state indication signal indicating whether or not the phase synchronization loop is in the lock state. In the reproduction information processing means, a sum total of respective outputs of coefficient multiplying means corresponding to the number of a plurality of sample values for carrying out weighting or equalizing outputted from the digital delay line with taps is taken by the adding means to deliver, to the coefficient multiplying means, by using coefficient supply means, weighting coefficients and equalizing coefficients corresponding to the state of the phase synchronization loop in accordance with the state indication signal from the phase synchronization loop control means and the processing timing signal.

In addition, the equalizing coefficient is given as a coefficient for carrying out equalization so as to satisfy the Nyquist first criterion.

BRIEF DESCRIPTION OF THE DRAWINGS

FIGS. 10A–10J are timing diagrams showing an example of the operation of the above-mentioned unique pattern detector.

DESCRIPTION OF THE PREFERRED EMBODIMENT

A preferred embodiment of a clock reproducing apparatus according to this invention will now be described with reference to the attached drawings.

Figure 1:
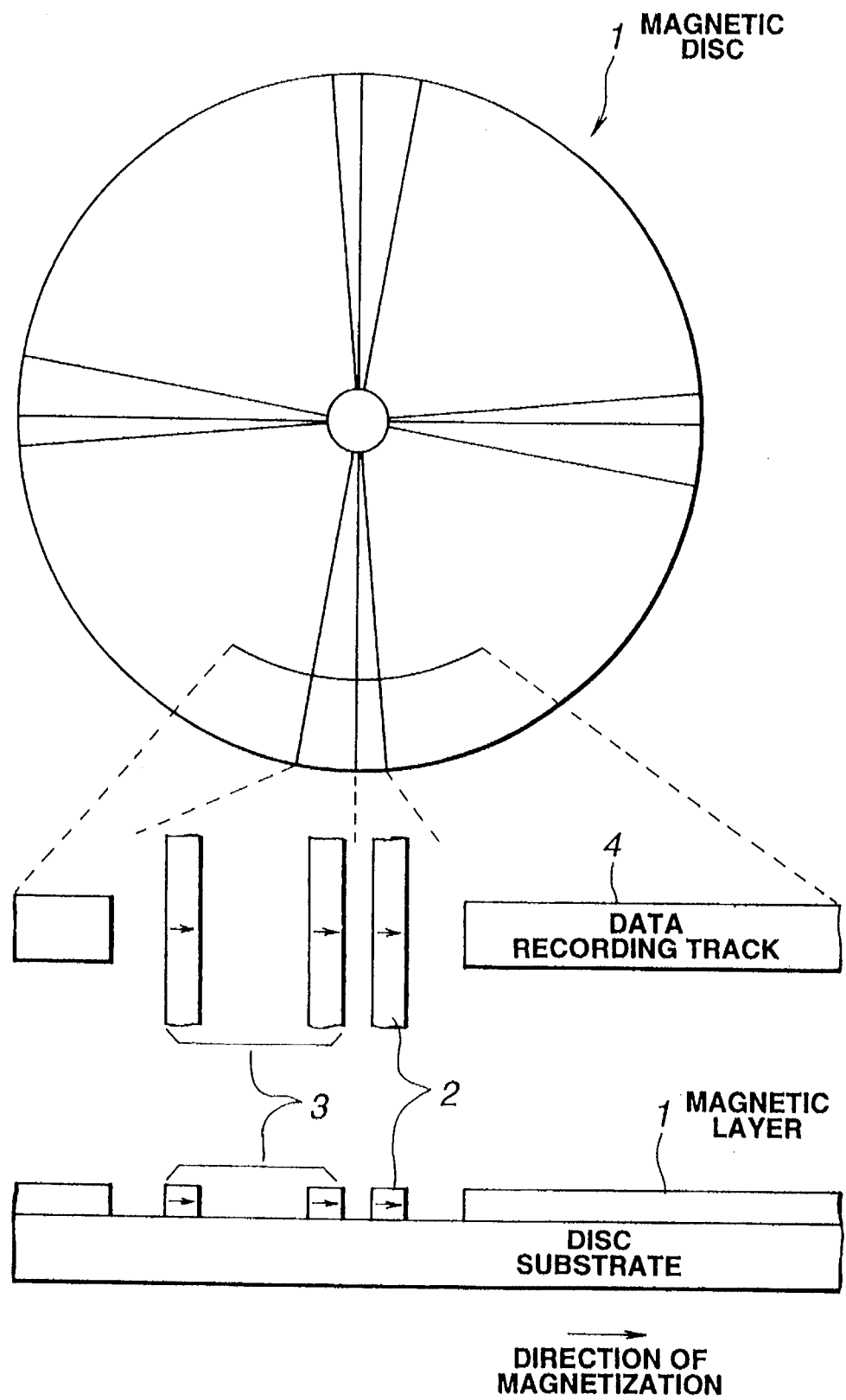
FIG. 1 is a view showing a clock pattern on a magnetic disc used in an external clock type magnetic disc system.

The clock reproducing apparatus according to this invention carries out reproduction of clock with respect to an external clock type magnetic disc i as shown in FIG. 1, for example.

On this magnetic disc 1, clock patterns 2 and unique patterns 3 in a radial form used for reproduction of clock are formed at equal intervals on recording tracks. In this figure, reference numeral 4 denotes portions of data recording tracks. The number of these clock patterns is approximately several tens to several thousands at one circumference of disc. These clock patterns are formed by partially removing the magnetic layer of the magnetic disc 1 by using a technique such as etching, and are adapted to be d.c. magnetized in one direction by a magnetic head. When these clock patterns are reproduced by the magnetic head, isolated waveforms are reproduced at the forward edge and the backward edge of each pattern.

The unique pattern 3 is a bundle of several magnetization patterns formed by the same technique as that applied to the clock pattern 2. Reproduced waveforms therefrom have the feature that their existence can be easily detected also by asynchronous detection in which no clock is particularly referenced. The purpose of this unique pattern is to recognize an approximate existing time of the clock pattern 2. This is necessary particularly at the process of establishment of initial synchronization, such as, for example, at the power-on time, etc.

Figure 2:
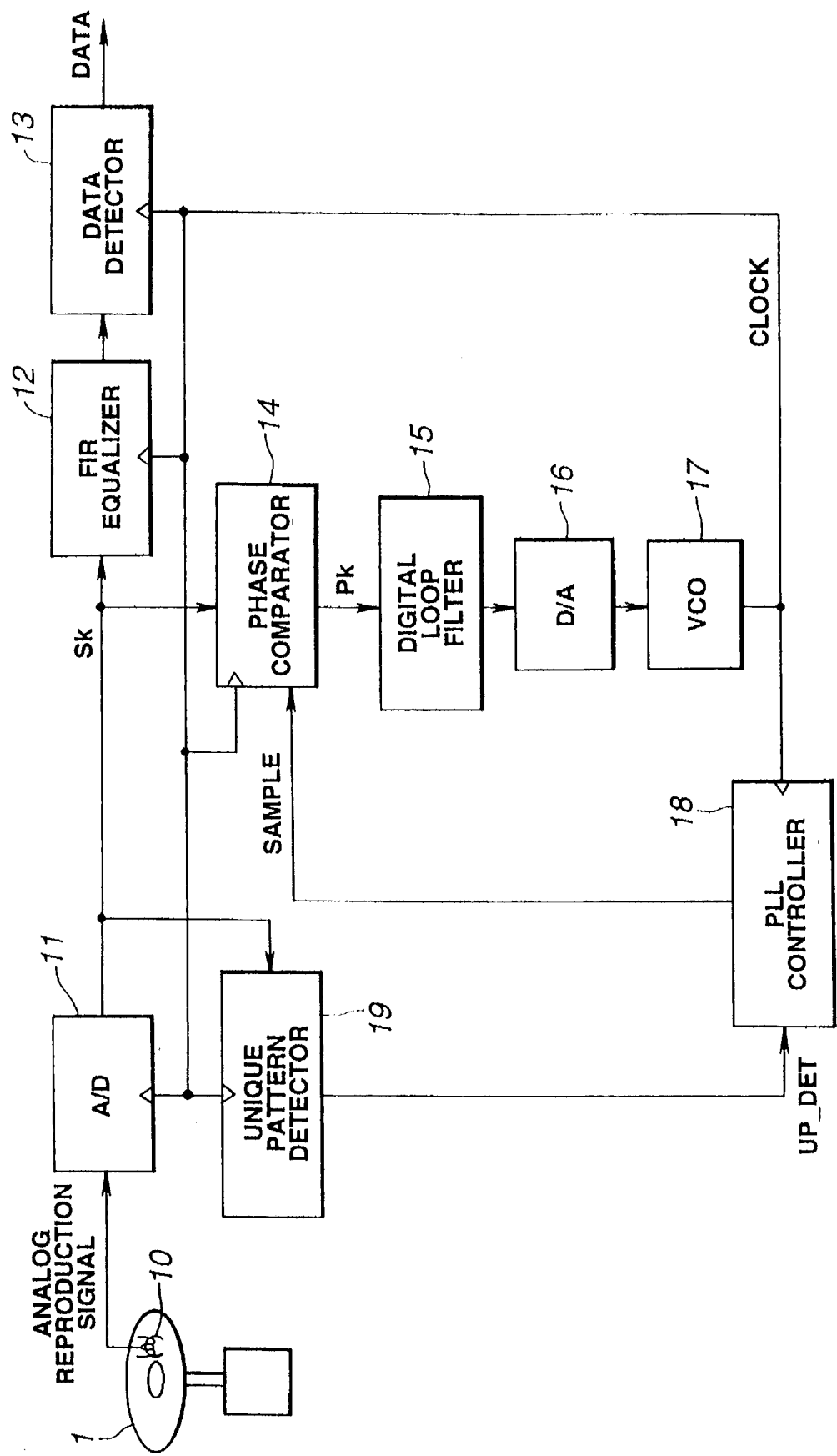
FIG. 2 is a block diagram showing the configuration of a clock reproducing apparatus according to this invention.

A clock reproducing apparatus according to this invention is constructed as shown in FIG. 2, for example.

In this embodiment, this invention is applied to the reproducing system of the external clock type magnetic disc 1 shown in FIG. 1. The entirety of the system shown in FIG. 2 includes a clock reproducing system for reproducing a clock from a reproduction signal, and a data detecting circuit utilizing the reproduced clock.

A reproduction signal reproduced by a magnetic head 10 from tracks of the external clock type magnetic disc i is converted to a digital signal sample $S_k$ (k is an integer) by an A/D converter 11. The digital signal sample $S_k$ thus obtained is channel-equalized by a digital equalizer 12. From the channel equalized signal, data is detected by a data detector 13. This reproducing circuit system operates in synchronism with a data existing point clock CLOCK that the clock reproducing system, i.e., the clock reproducing apparatus according to this invention, outputs.

The clock reproducing apparatus according to this invention reproduces data existing point clock CLOCK by phase synchronization loop (so called PLL). The outline of the configuration of this phase synchronization loop will be first described.

A digital signal sample $S_k$ which has undergone A/D conversion by the A/D converter 11 is inputted to a phase comparator 14. This phase comparator 14 implements linear combination operation processing to the digital signal sample $S_k$ by digital operation to generate a phase comparison output signal $P_k$ which is phase information.

Figure 3:
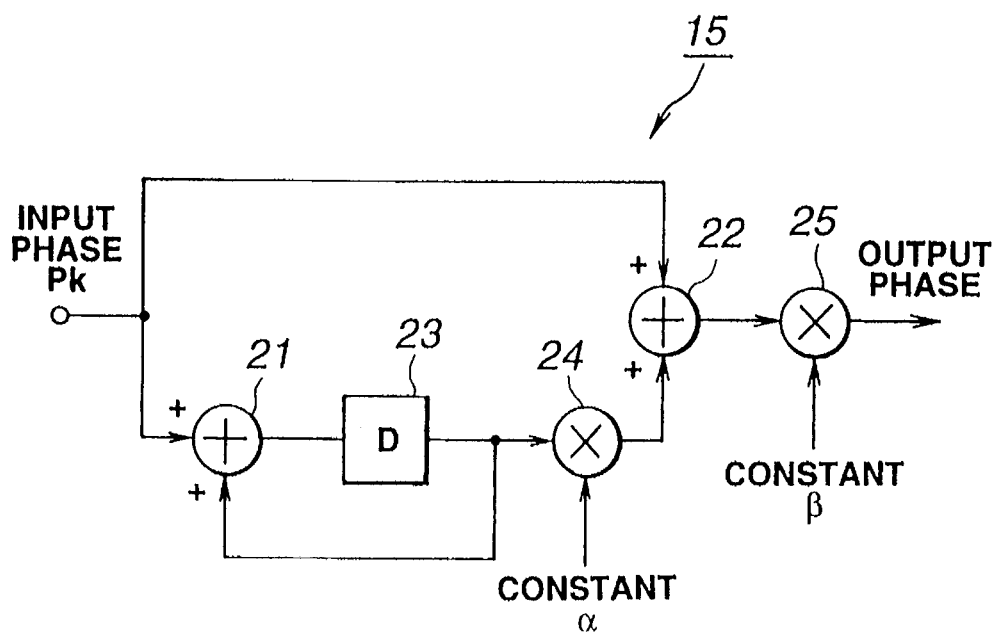
FIG. 3 is a diagram showing, in a block form, the configuration of a digital loop filter in the above-mentioned clock reproducing apparatus.

This phase comparison output signal $P_k$ is processed at a digital loop filter 15. The signal thus processed is then converted to an analog signal by a D/A. converter 16 to generate a control voltage of a voltage controlled oscillator (VCO) 17. The digital loop filter 15 is a complete integrating type lag/lead filter composed of adders 21, 22, a unit delay element 23, and constant multipliers 24, 25 as shown in FIG. 3, for example, and serves to adjust the time region response characteristic and the frequency region response characteristic of the phase synchronization loop. The voltage controlled oscillator 17 oscillates a data existing point clock CLOCK to deliver this data existing point clock CLOCK to A/D converter 11, digital equalizer 12 and data detector 13, etc. of the data detecting circuit system, and to deliver it to a PLL controller 18. The PLL controller 18 operates in synchronism with the data existing point clock CLOCK to deliver a phase comparison timing signal SAMPLE to the phase comparator 14. This phase comparison timing signal SAMPLE is generated by the PLL controller 18 after a clock time determined in advance from a pulse position of a detected unique pattern.

Figure 4:
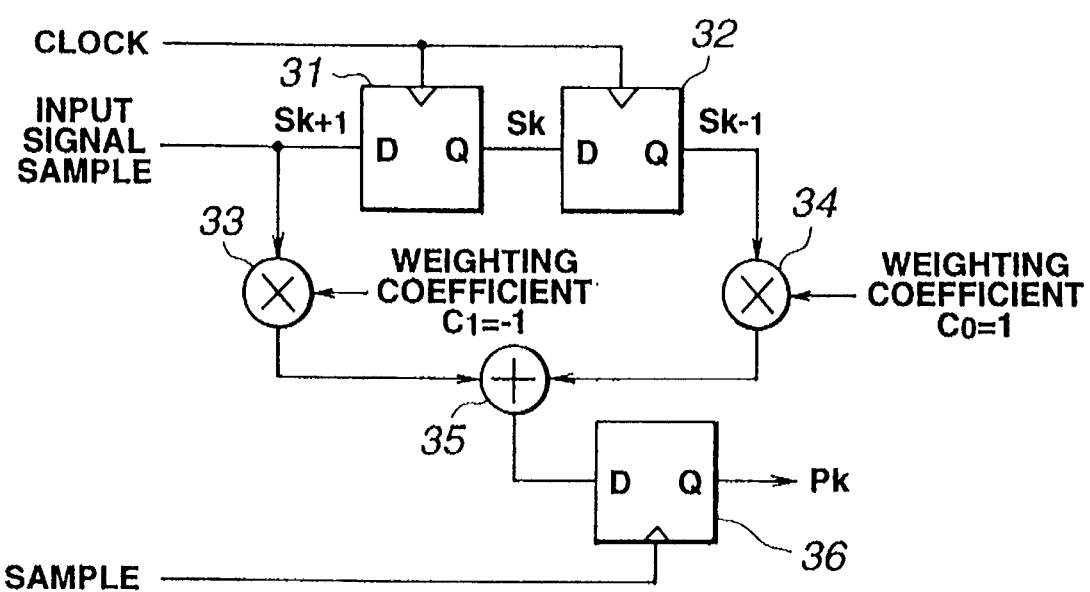
FIG. 4 is a block diagram showing the configuration of a phase comparator in the above-mentioned clock reproducing apparatus.

Further, the phase comparator 14 is composed, as shown in FIG. 4, for example, of two registers 31, 32 operative by data existing point clock CLOCK, multipliers 33, 34 for multiplication of respective weighting coefficients $C_1$, $C_0$, an adder 35, and a register 36 operative by a phase comparison timing pulse SAMPLE.

In this phase comparator 14, when it is assumed that the time that the data existing point clock CLOCK generated by the phase synchronization loop indicates is t=kT (k is integer) and an input is a digital signal sample $S_{k+1}$ (its value is hereinafter assumed to be a sample value $S_{k+1}$) which is a sample value of a reproduction signal which has undergone A/D conversion, an input signal sample respectively takes sample values $S_k$, $S_{k-1}$ after having undergone delaying by registers 31, 32. At this phase comparator 14, sample value $S_{k+1}$ is multiplied by constant $C_1$ by multiplier 33, and sample value $S_{k-1}$ is multiplied by constant $C_0$ by multiplier 34. By calculating a sum total thereof by using adder 35, a phase comparison output signal $P_k$ expressed below is provided:

$$P_k = C_0 \cdot S_{k-1} + C_1 \cdot S_{k+1}$$

Figure 5:
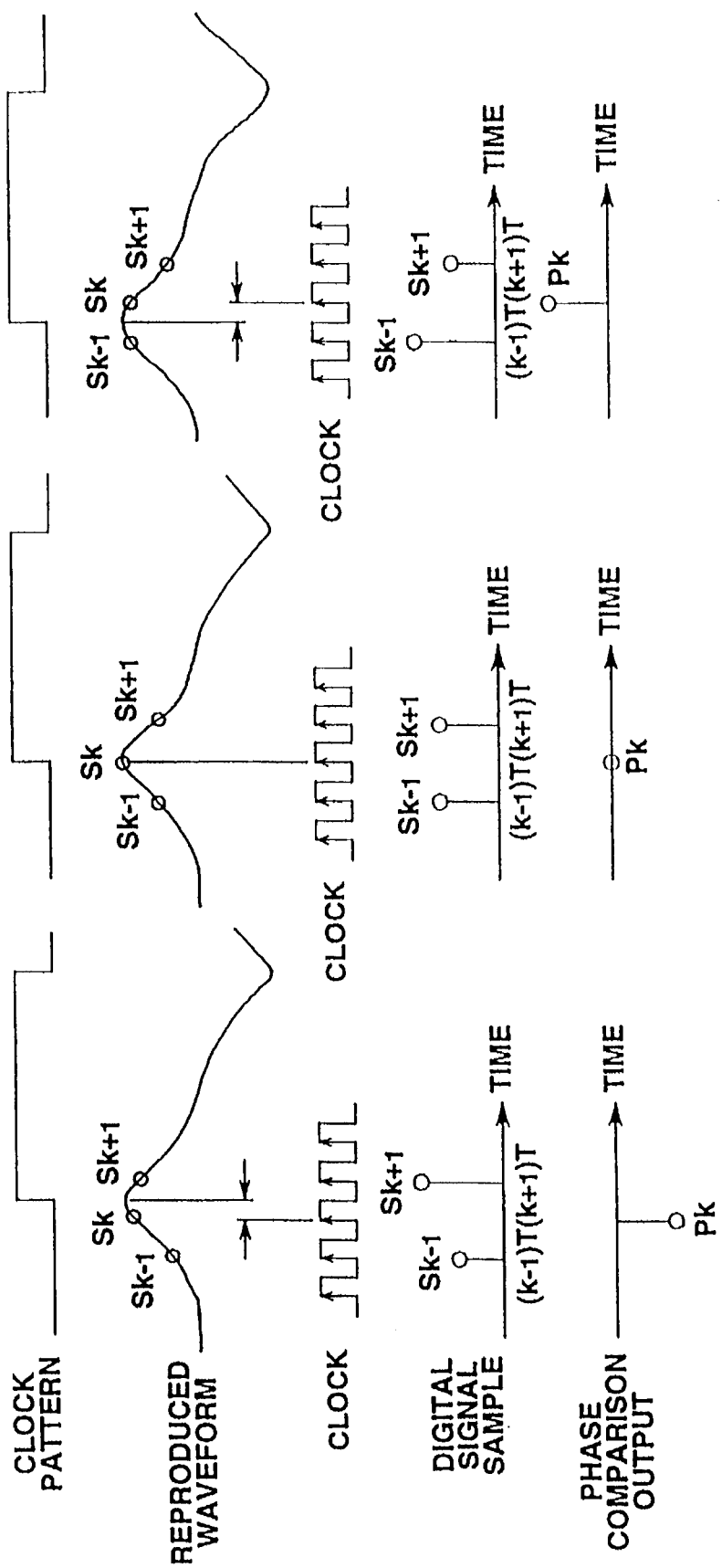
FIGS. 5(a) through 5(c) are views showing the operation principle of the above-mentioned phase comparator.
Figure 7:
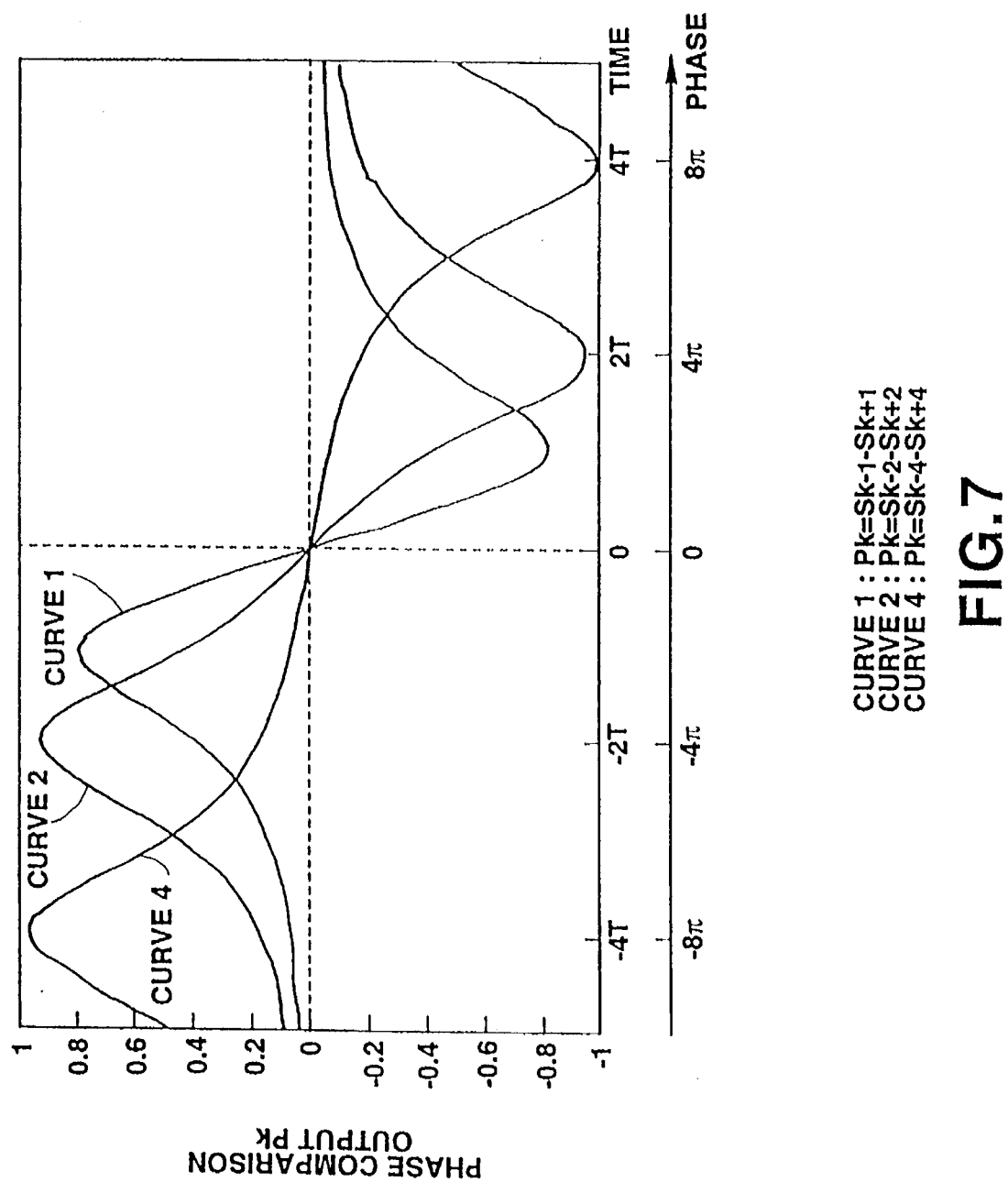
FIG. 7 is a characteristic diagram showing a phase comparison characteristic of the phase comparator of FIG. 6.

The principle of the operation of the phase comparator 14 is shown in FIGS. 5(a)–5(c). FIG. 5(a) illustrates operation when the clock lags the clock pattern. FIG. 5(b) illustrates operation when the clock and clock pattern are in phase. Finally, FIG. 5(c) illustrates operation when the clock leads the clock pattern. Since a reproduced isolated waveform from one edge of clock pattern 2 is substantially symmetrical, when coefficient values are assumed to be respectively $C_0=1$ and $C_1=-1$, in the case where the peak of the isolated waveform exists at time t=kT, sample value $S_{k-1}$ at time t=(k−1)T and sample value $S_{k+1}$ at time t=(k+1)T are substantially equal to each other, so a calculated value at this phase comparator 14 becomes equal to zero. However, in the case where clock is shifted with respect to the peak position, i.e., in the case where there is any phase difference, the above-mentioned calculated value does not equal zero. Eventually, a phase comparison characteristic as indicated by curve 1 of FIG. 7 is provided. This phase comparison characteristic has a substantially linear operation region at the central portion, and an input phase difference in that range is therefore correctly converted to a phase comparison output $P_k$. This linear operation region is substantially represented by [−T, +T] as a time difference, and is substantially represented by [−360°, +360°] as a phase difference. A phase comparison range in a stable follow-up state (so called lock range) is sufficiently broad. Although this calculation is carried out continuously at discrete times, clock pattern which can be referenced for reproduction of clock in actual is only clock pattern 2. For this reason, the register is controlled so that timing signal SAMPLE is delivered from PLL controller 18 and only a calculated result corresponding to the edge of the clock pattern 2 is caused to be phase information.

Figure 6:
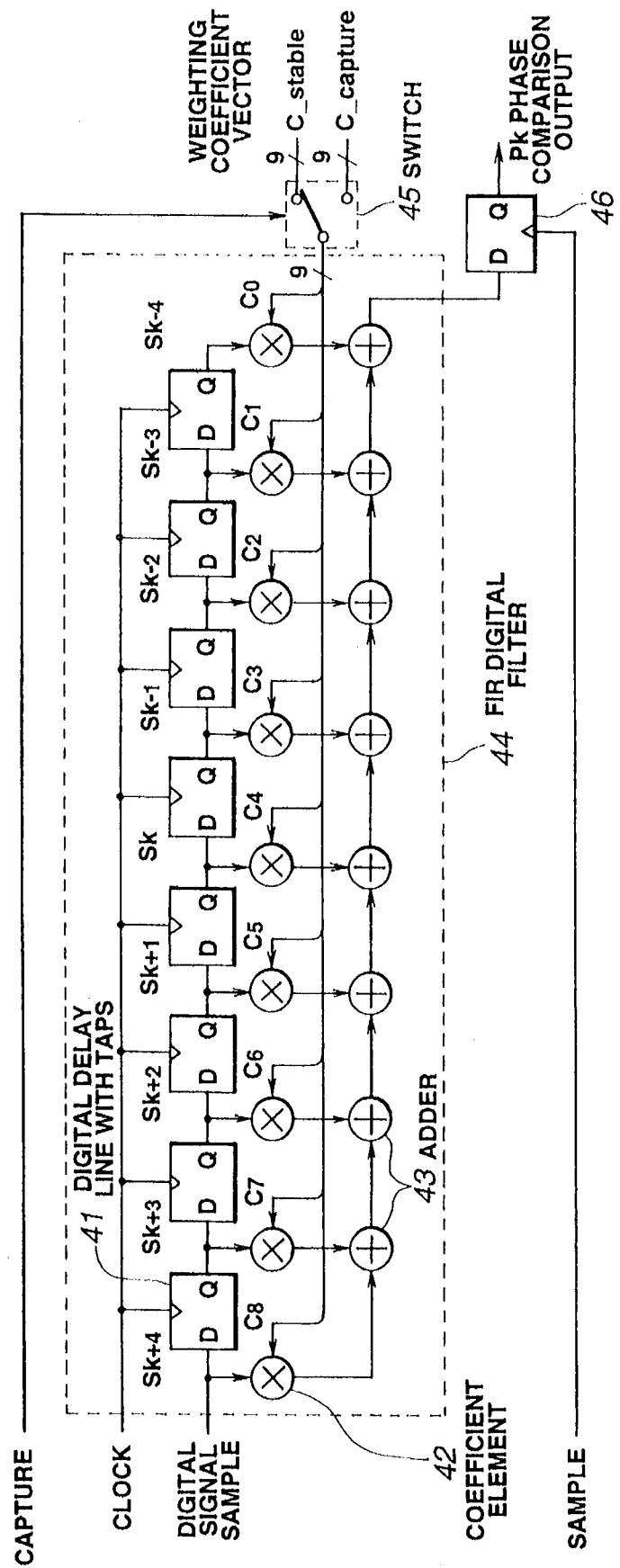
FIG. 6 is a block diagram showing another example of the configuration of the phase comparator in the above-mentioned clock reproducing apparatus.

FIG. 6 is a view showing another example of the configuration of the phase comparator 14. The phase comparator 14 shown in FIG. 6 calculates a phase difference by using a FIR digital filter 44 composed of a digital delay line 41 with taps, coefficient elements 42, and adders 43 for providing a sum total to output phase information through a register 46 operative by phase comparison timing signal SAMPLE from PLL controller 18.

This phase comparator 14 is of a structure such that coefficients in all the taps are collectively dealt as coefficient vector, and are switched at a time by a switch 45 by an instruction from external of the phase comparator 14. The purpose of employment of such configuration is to change the phase comparison characteristic in dependency upon the operating state of the phase synchronization loop.

An example of the phase comparison characteristic with respect to three kinds of coefficient vectors is shown in FIG. 7. The curve 1 indicates the case where the coefficient vector is expressed as follows:

$$\text{C-stable} = [C_0, C_1, C_2, C_3, C_4, C_5, C_6, C_7, C_8]$$
$$= [0, 0, 0, 1, 0, -1, 0, 0, 0]$$

The phase comparator 14 calculates a phase difference $P_k$ expressed as follows:

$$P_k = S_{k-1} - S_{k+1}$$

This means that the same calculation as that of the example of the configuration of FIG. 4 is carried out. In this case, the gradient of the linear operation region of the phase comparison characteristic is sharp (great), so the conversion gain of phase comparison is great. Namely, this means that as the gradient becomes more sharp, time change can be converted to voltage with a higher sensitivity. However, as previously described, the linear operation range is approximately [−T, +T], and is somewhat narrow in the case where the operation of the phase synchronization loop is in transient state such as synchronization capture state, etc.

On the contrary, when setting of coefficient vectors is made as follows:

$[C_0, C_1, C_2, C_3, C_4, C_5, C_6, C_7, C_8] = [1, 0, 0, 0, 0, 0, 0, 0, -1]$ the phase comparator 14 calculates phase information $P_k$ expressed below:

$$P_k = S_{k-4} - S_{k+4}$$

Thus, phase comparison characteristic is as indicated by the curve 4 of FIG. 7.

In this case, the operation region is widened substantially to [−4T, +4T]. Thus, a relatively large phase difference in the synchronization capture state can be also detected. However, gradient of the curve, i.e., phase comparison gain at the both ends of the operation region and that at the central portion are greatly different from each other. Accordingly, in the case where the phase synchronization loop is in the stable follow-up (lock) state and phase comparison is carried out by using the central portion of the curve, there is the problem that the loop gain of the phase synchronization loop becomes smaller, resulting in the deteriorated phase follow-up characteristic.

Figure 8:
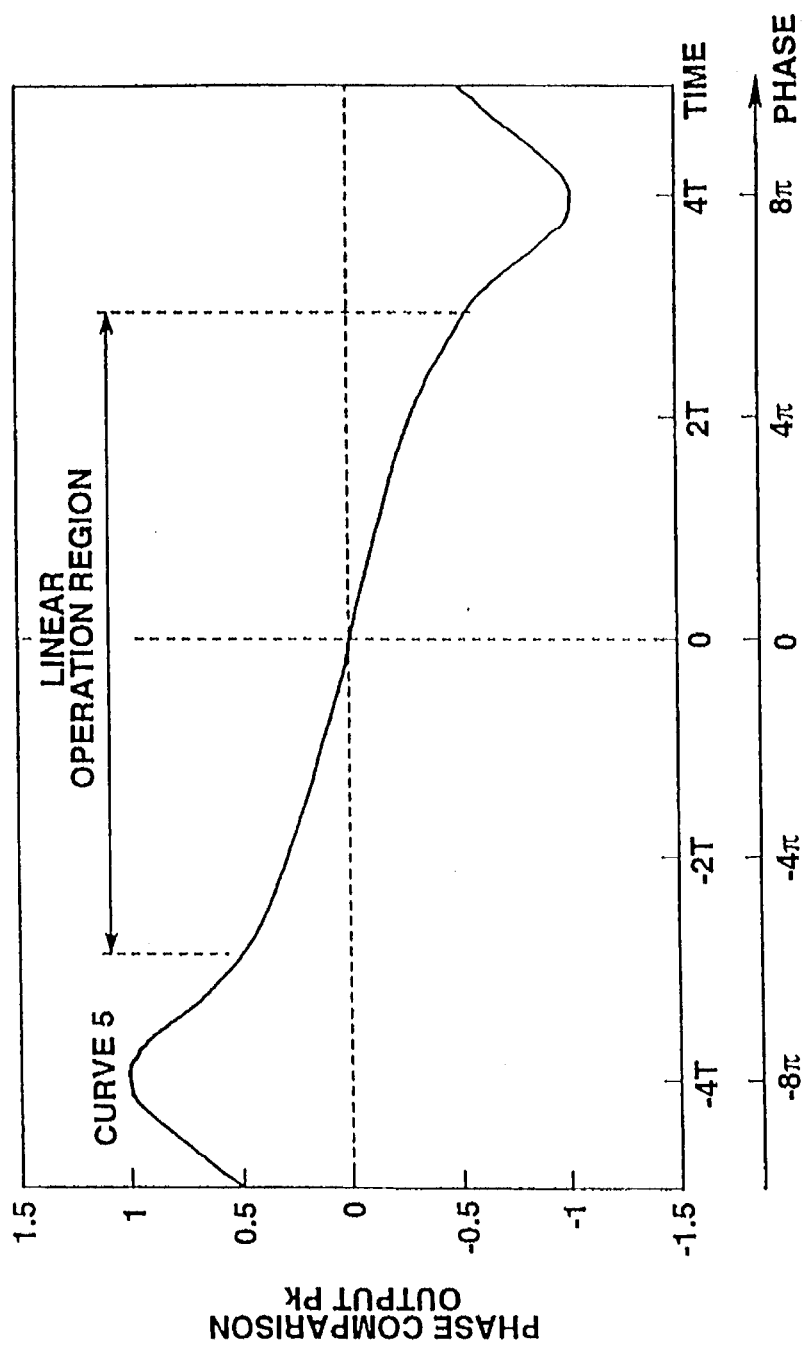
FIG. 8 is a characteristic diagram showing a phase comparison characteristic of a phase comparator using four samples.

When the configuration of FIG. 8 is employed in this way, control of the phase comparison characteristic can be made by coefficient vectors. Thus, by switching coefficient vectors in accordance with transition of the operating state of the phase synchronization loop, it is possible to present optimum phase comparison characteristics in the synchronization capture state and in the stable follow-up (lock) state.

Further, in the case where the phase synchronization loop is in the synchronization capture state, compatibility between a broad operation region and uniformity of conversion gain of phase comparison in that region is required. To realize this, linear superposition of the curve 2 and the curve 4 of FIG. 7 may be used. Here, the curve 2 shows the case where $P_k = S_{k-2} - S_{k+2}$ is calculated, and indicates a phase comparison characteristic having the property intermediate between the curves 1 and 4. Assuming now that coefficient vectors are expressed below:

$$\begin{aligned}\text{C-capture} &= [C_0, C_1, C_2, C_3, C_4, C_5, C_6, C_7, C_8] \\ &= [1, 0, 0.125, 0, 0, 0, -0.125, 0, -1]\end{aligned}$$

the phase comparator 14 calculates phase information described below:

$$P_k = S_{k-4} + 0.125 \cdot S_{k-2} - 0.125 \cdot S_{k+2} - S_{k+4}$$

The phase comparison characteristic in this case is shown in FIG. 8. In a broad operation region [−3T, +3T], a substantially linear characteristic is provided. It is seen that compatibility between two performances can be made. Further, since respective elements values of the coefficient vectors are represented as a power of 2, respective coefficient elements 42 of the FIR digital filter 44 shown in FIG. 6 can realize weighting by carrying out bit shift of sample values which are digital values of binary number. As a result, there is no need for a multiplier. Thus, the hardware can be simplified.

The operation of the phase synchronization loop in the clock reproducing apparatus according to this invention using phase comparator 14 as described above will now be described.

Initially, unique pattern detector 19 for assisting establishment of synchronization for the clock pattern 2 will be described. This unique pattern detector 19 serves to detect unique pattern 3 by asynchronous detection using no clock in the state where synchronization is not yet established, and is constructed as shown in FIG. 9, for example.

Figure 9:
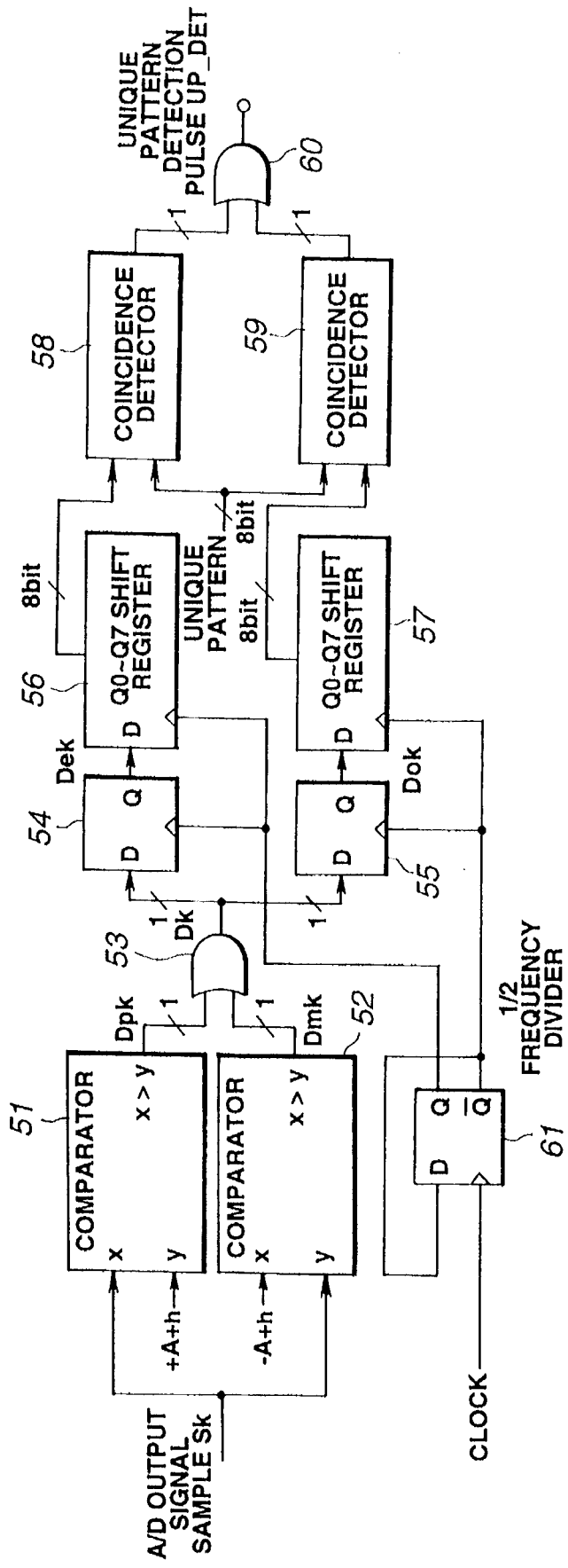
FIG. 9 is a block diagram showing the configuration of a unique pattern detector in the above-mentioned clock reproducing apparatus.

The unique pattern detector 19 shown in FIG. 9 comprises comparators 51 and 52 supplied with a signal sample $S_k$ sampled at a rate of 2 samples per each bit of unique pattern 3 by the above-described A/D converter 11.

The comparator 51 makes a comparison between a predetermined threshold level $+A_{th}$ and a digital signal sample $S_k$. As a result, when $S_k > +A_{th}$, trinary data +1 is detected by the comparator 51, so $D_{pK}=1$ is outputted. In the case opposite to the above, $D_{pK}=0$ is outputted.

Similarly, the comparator 52 makes a comparison between a threshold level $-A_{th}$ and the digital signal sample $S_k$. As a result, when $S_k < -A_{th}$, trinary data −1 is detected by the comparator 52, so $D_{mk}=1$ is outputted. In the case opposite to the above, $D_{mk}=0$ is outputted.

For the purpose of converting trinary data to binary data, one may disregard the sign of the trinary data. By performing logical sum of $D_{pk}$ and $D_{mk}$ by using OR gate 53, binary data $D_k$ is provided. Since such binary data Dk are provided two by two per each bit of unique patterns 3 formed on the medium as shown in FIGS. 10A–10J, they are distributed to a shift register 56 for even series and a register 57 for odd series alternately through registers 54, 55. With respect to results obtained after having undergone respective series $D_{ok}$, $D_{ek}$, comparisons with true unique pattern (e.g., 110110) are respectively made by coincidence detectors 58, 59. When coincidence is detected, unique pattern detection pulse UP-DET is outputted through OR gate 60.

It is to be noted that the unique pattern detector 19 may be of a structure to calculate Hamming distance between respective series and the unique pattern in place of detection of coincidence, whereby when that Hamming distance is less than a predetermined distance, judgment is made such that the unique pattern is detected. In this way, the unique patten detector may be constituted by a digital circuit.

Figure 11:
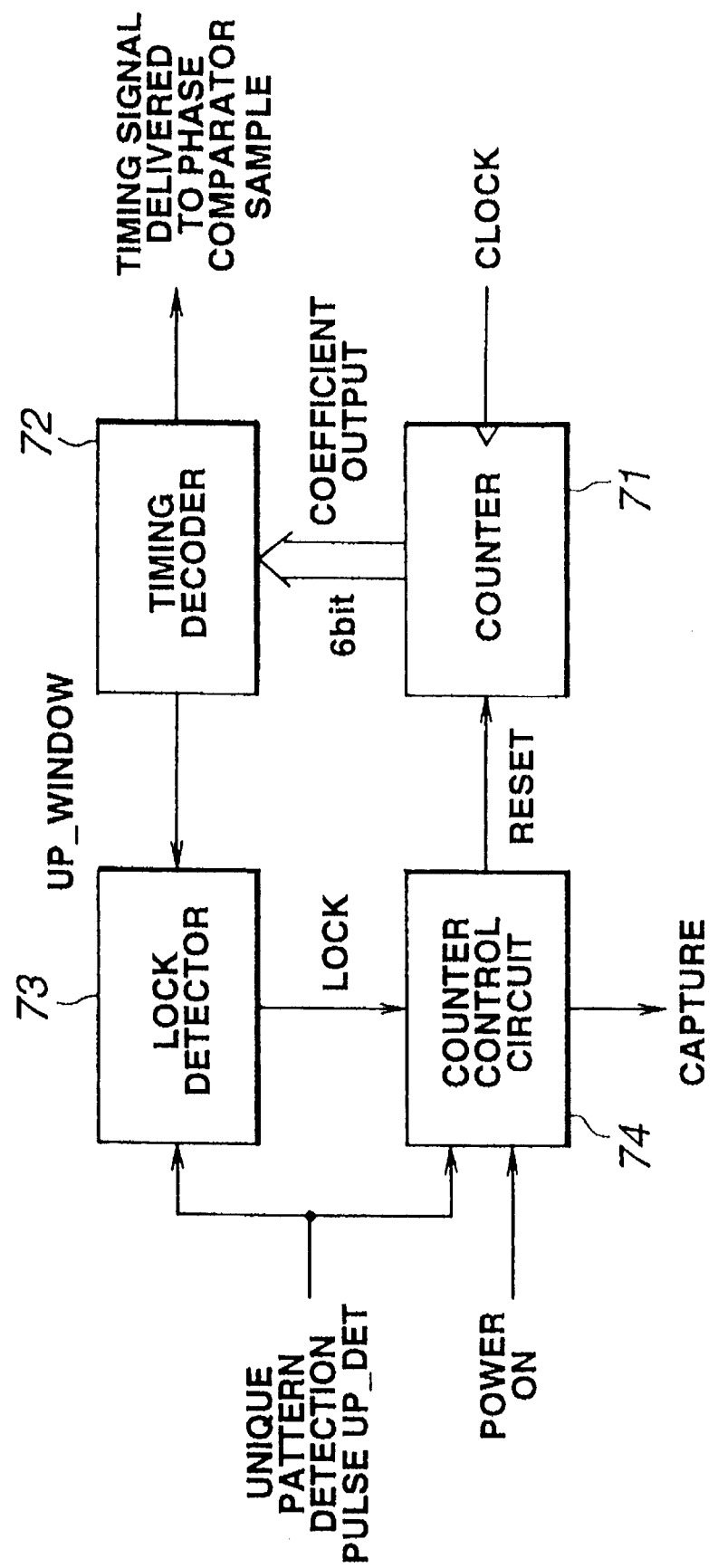
FIG. 11 is a block diagram showing the configuration of a PLL controller in the above-mentioned clock reproducing apparatus.
Figure 12:
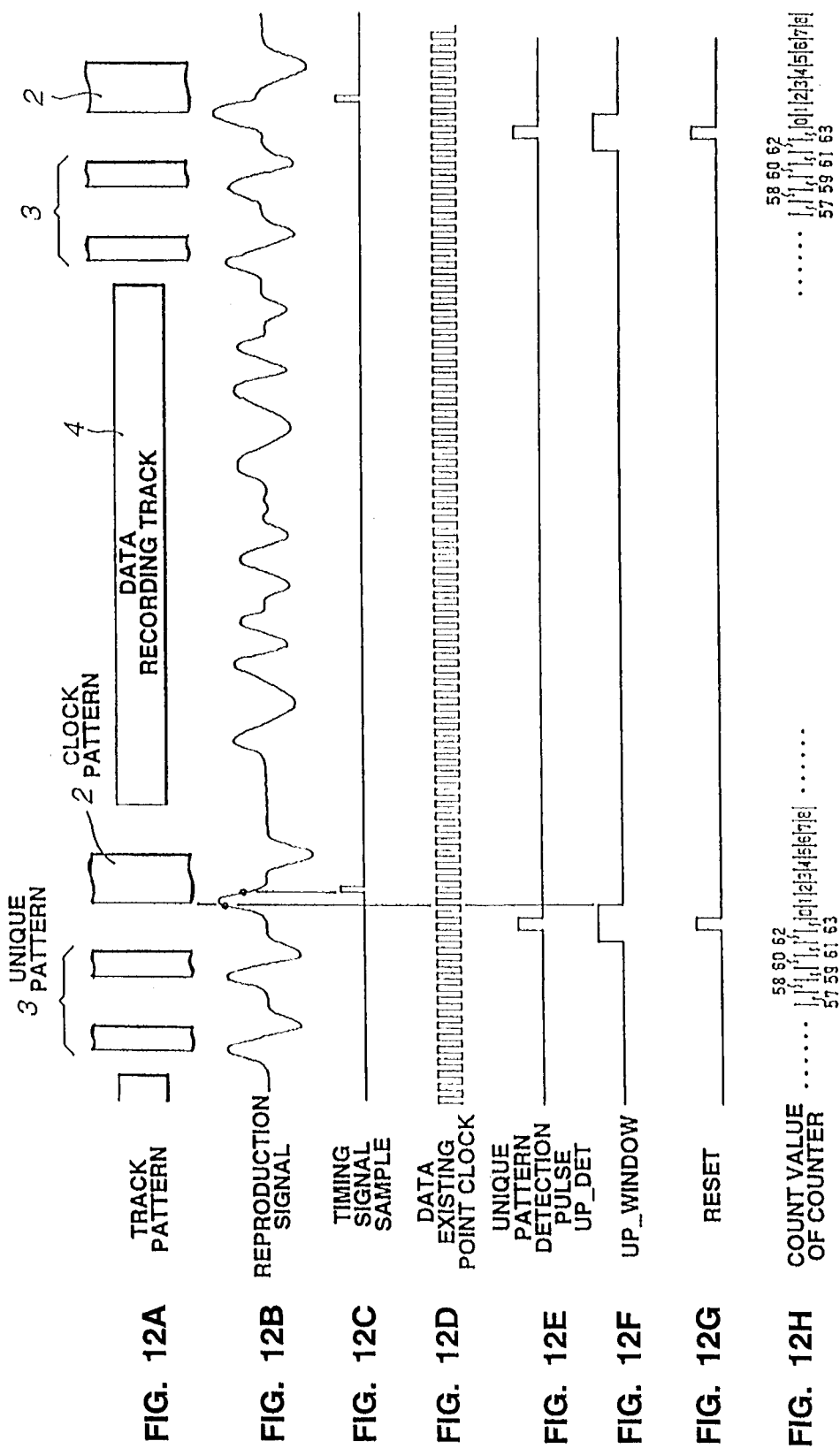
FIGS. 12A–12H are timing diagrams showing the operation of a phase synchronization loop in the above-mentioned clock reproducing apparatus.

Further, PLL controller 18 for controlling the operation of the entirety of the phase synchronization loop is constructed as shown in FIG. 11.

In FIG. 11, converter 71 is a synchronous binary incremental counter operative in accordance with a reproduced data existing point clock CLOCK of the phase synchronization loop, and serves to carry out counting of data existing point clock with the number obtained by dividing appearance interval of the clock pattern 2 by data existing point clock period being as modulus. For example, when it is assumed that the period of the data existing point clock CLOCK is 100 nS and the clock pattern appearance period is 6400 nS, this counter 71 is a binary counter which can carry out counting from 0 to 63.

A count output of the counter 71 indicates the time between two clock patterns, and is delivered to a timing decoder 72 as digital data of 6 bits.

This timing decoder 72 is a combinational logic circuit of 6 bit parallel input/2 bit parallel output. As shown in FIGS. 12A–12H, the timing decoder 72 generates a phase comparison timing signal SAMPLE and a window signal UP-WINDOW at a specific time between two clock patterns. These signals SAMPLE, UP-WINDOW are both generated after clock times determined in advance from a pulse position of a detected unique pattern. For example, in the case of this embodiment, signal SAMPLE is generated after 2 clock periods, and signal UP-WINDOW is generated after 62 clock periods.

Further, lock detector 73 is a circuit for judging whether or not the phase synchronization pattern is correctly synchronized with a clock pattern reproduced waveform. In this judgment, e.g., it is utilized that unique pattern detection pulse UP-DET is detected at an interval of equal number of clocks in the synchronous state. Namely, an approach is employed to logically judge whether or not unique pattern detection pulse UP-DET exists within window signal UP-WINDOW generated by the timing decoder 72 every time that unique pattern detection pulse UP-DET is newly inputted, thus to judge that synchronization is continued if that signal exists therewithin. On the other hand, in the case where a new unique pattern detection pulse UP-DET does not exist within UP-WINDOW successively several times, the lock detector 73 judges that the pulse synchronization loop is in step out state, thus to output a lock detection signal LOCK of LOCK=0.

Further, counter control circuit 74 is a logic circuit adapted to receive unique pattern detection pulse UP-DET, the lock detection signal from the lock detector 73 and a signal POWER-ON indicating ON of power, and to output counter reset signal RESET and PLL state indication signal CAPTURE. The counter reset signal RESET is outputted in the case where lock detection signal LOCK is LOCK=0 and unique pattern detection pulse UP-DET is given. On the other hand, counter reset signal RESET is not outputted for some time once that signal is outputted. As a result, the counter 71 continues operation to attempt to establish synchronization.

Figure 13:
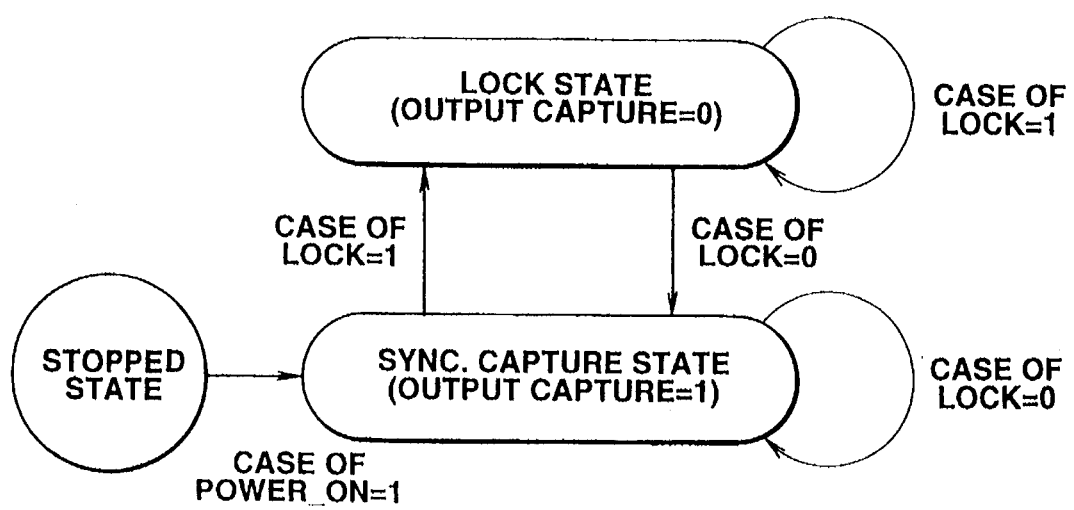
Fig. 13 is a transition diagram showing the operation state of the phase synchronization loop.

In this embodiment, as the state transition diagram of the phase synchronization loop is shown in FIG. 13, immediately after power supply is turned ON, etc., the phase synchronization loop first shifts to the synchronization capture state to attempt to establish synchronization by making reference to unique pattern detection pulse UP-DET. Since the unique pattern detection pulse UP-DET indicates a rough appearance time of the clock pattern 2 to be phase-compared, if counter 71 is compulsorily reset at this time to start counting for a second time, there is high possibility that a phase comparison timing signal SAMPLE outputted from the timing decoder 72 may fall within the phase comparison range. Thus, establishment of synchronization is facilitated.

Until the lock detector 73 judges establishment of synchronization to output lock detection signal LOCK, the phase synchronization loop remains in the synchronization capture state. In this state, it is desirable that the phase comparison mechanism has a broad linear operation region. Thus, by CAPTURE signal that PLL controller 18 outputs, coefficient vector delivered to the above-described phase comparator 14 is set to coefficient vector C-capture for synchronization capture.

After the lock detector 73 judges that synchronization has been established, the state of the phase synchronization loop shifts to the stable follow-up (lock) state in FIG. 13. Since it is sufficient in this state that the linear operation region of the phase comparator 14 is narrow, coefficient vector of this circuit is switched to vector C-stable for stable state. Also in the stable follow-up (lock) state, the lock detector 73 is continuing judgment of synchronization at all times. If step-out is detected, the phase synchronization loop shifts to the synchronization capture state for a second time to attempt to establish synchronization while making reference to the unique pattern 2.

In the above-described embodiment, as shown in FIG. 2, digital equalizer 12 of the data detecting circuit system and phase comparator 14 of the clock reproducing circuit system are separately provided. As apparent from FIG. 6, phase comparator 14 is of the same structure as that of FIR digital filter. When digital equalizer 12 is assumed to be a FIR digital filter, because clock pattern 2 required for the phase comparator 14 and data recording track 4 required for digital equalizer 12 do not overlap with each other, there may be employed, as shown in FIG. 14, a configuration in which one FIR digital filter is shared in time-divisional manner to execute the both functions.

Figure 14:
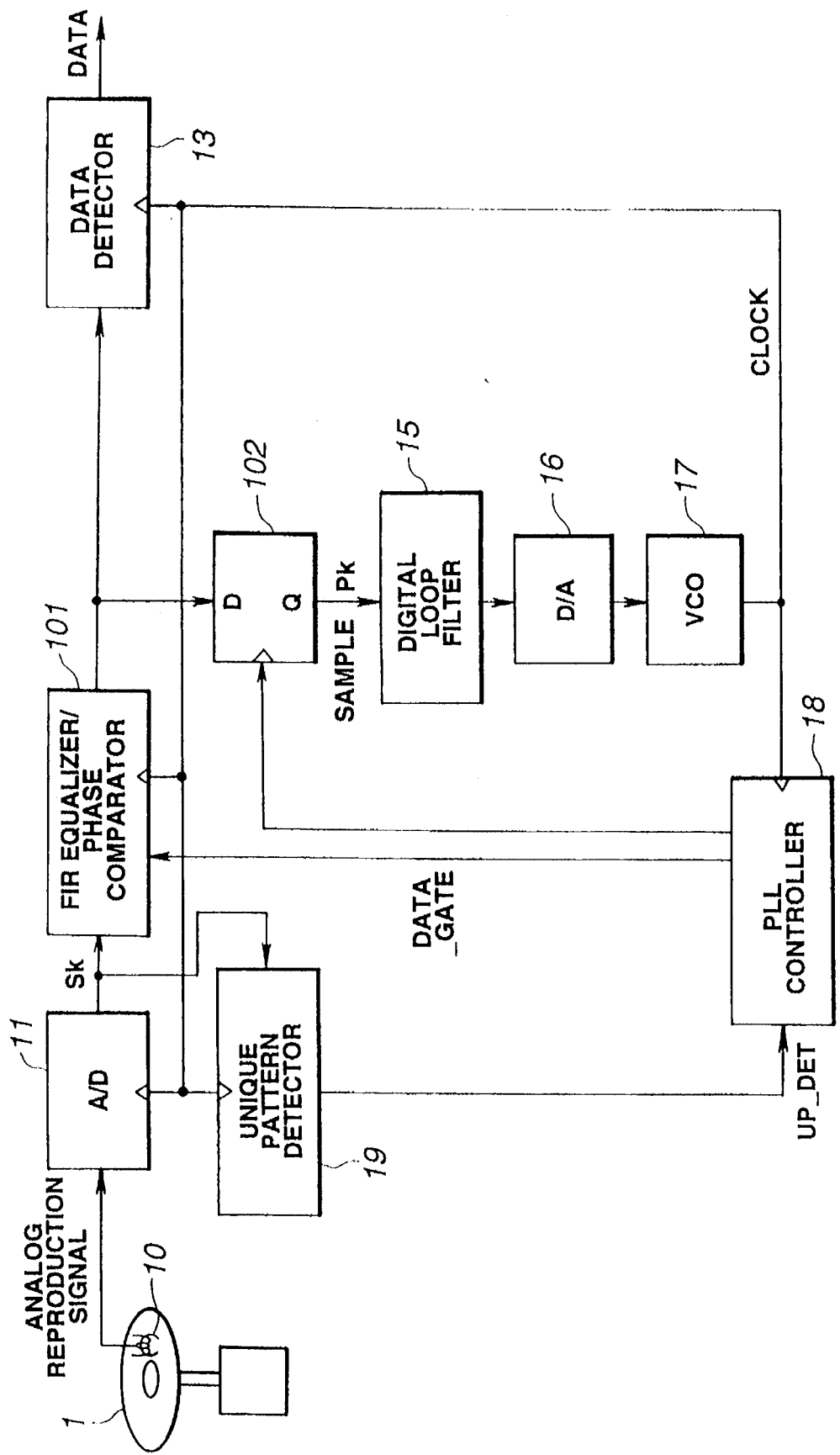
FIG. 14 is a block diagram showing the configuration of a clock reproducing apparatus commonly using a single FIR digital filter for digital equalizer and phase comparator in a time-division manner.

Namely, the embodiment shown in FIG. 14 is adapted for executing the functions of digital equalizer 12 and phase comparator 14 in the above-described embodiment shown in FIG. 2 by allowing a single FIR digital filter to be shared in time-divisional manner, and includes a FIR equalizer/phase comparator 101 supplied with a signal sample $S_k$ digitized by the above-described A/D converter 11. It is to be noted that, in the embodiment shown in FIG. 14, the same reference numerals are respectively attached to the same components as those of the embodiment shown in FIG. 2, and their detailed explanation is omitted.

Figure 15:
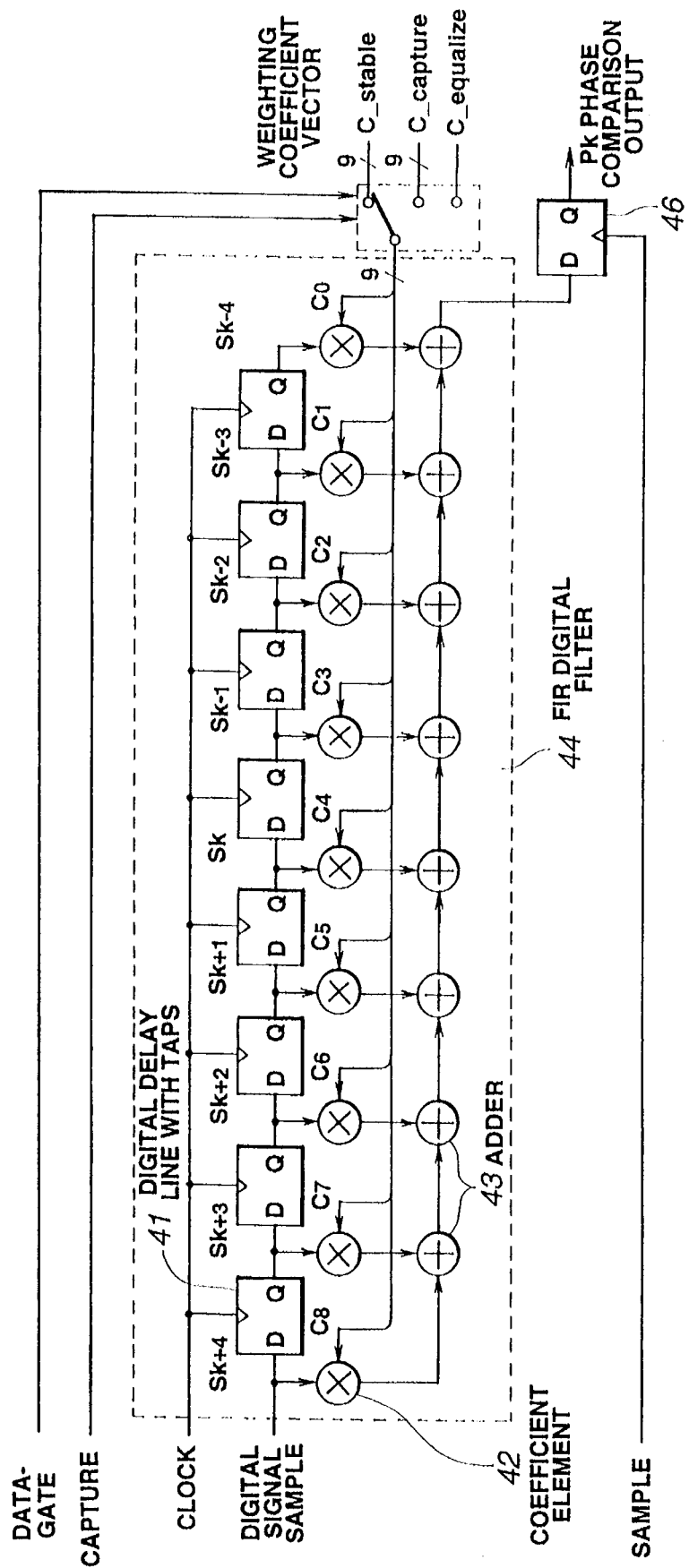
FIG. 15 is a block diagram showing the configuration of a FIR equalizer/phase comparator.
Figure 16:
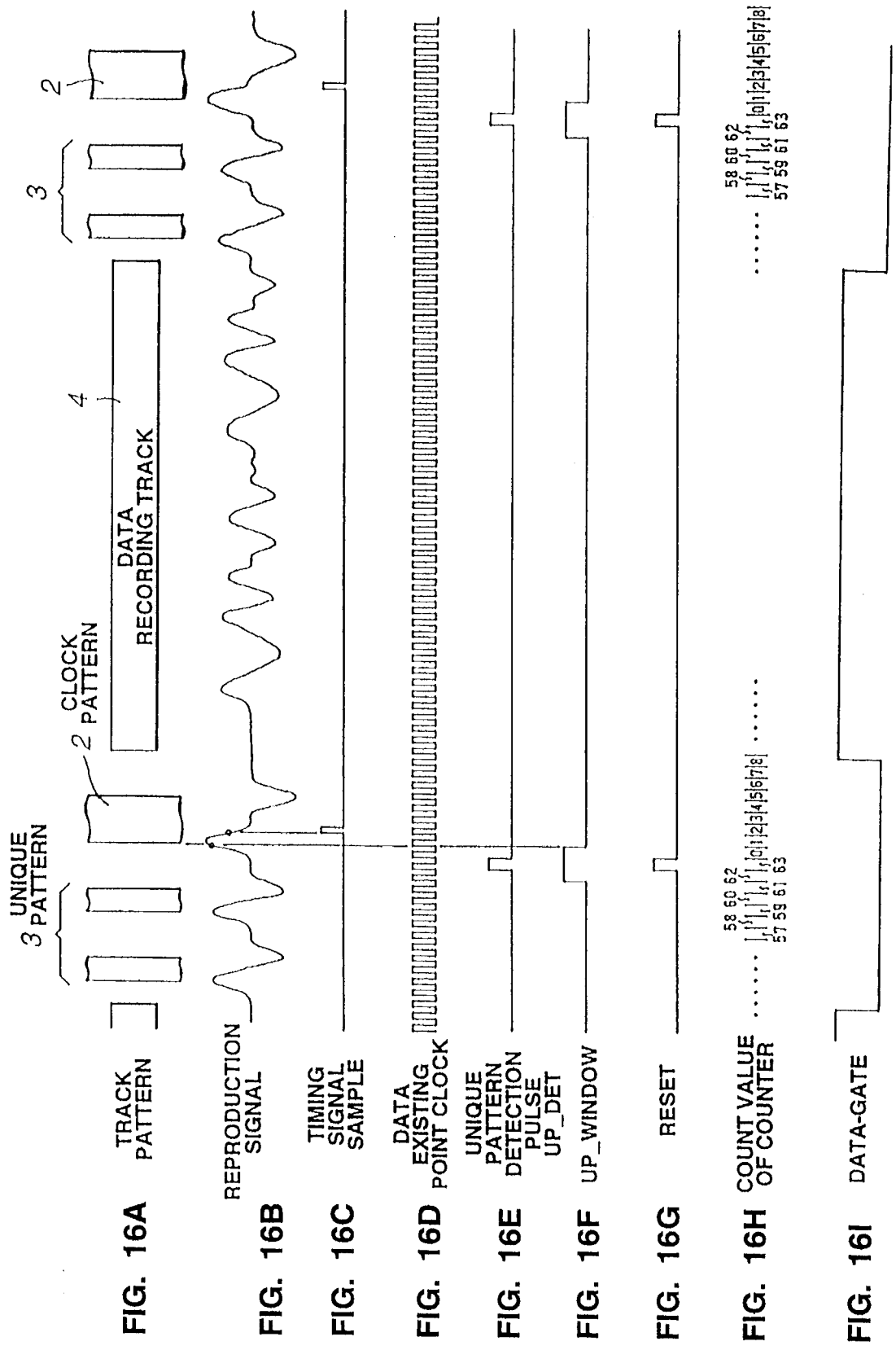
FIGS. 16A–16I are timing charts of processing in the above-mentioned clock reproducing apparatus of FIG. 14.

As shown in FIG. 15, the FIR equalizer/phase comparator 101 is comprised of a single FIR digital filter, and serves to carry out waveform equalizing processing and phase comparing processing in a time-divisional manner by time-division control signal DATA-GATE delivered from the above-described controller 18.

Further, the timing chart showing processing of reproduction of clock in FIG. 14 is shown in FIGS. 16A–16I.

The time-division control signal DATA-GATE is generated by timing decoder 72 of the PLL controller 18. In the case where signal sample $S_k$ which has undergone A/D conversion is a reproduction signal in the data recording area, DATA-GATE=1. On the other hand, in the case where signal sample $S_k$ is a reproduction signal in the servo area, DATA-GATE=0.

In the case where time-division control signal DATA-GATE delivered from the PLL controller 18 is DATA-GATE=1, the FIR equalizer/phase comparator 101 is supplied with coefficient vector C-equalize as an equalizer to implement waveform equalizing processing to signal sample $S_k$ with respect to a reproduction signal in the data recording area. For example, in the channel using partial response class 4, the equalizing coefficient vector C-equalize is determined by applying the least square to a step response waveform of the magnetic recording/reproducing channel with equal time interval non-interference waveform being as a target. For example, in this embodiment, the equalizing coefficient vector C-equalize is [−0.043, 0.104, −0.670, 1.000. 1.000, −0.670, 0.104, −0.043]. The data detector 13 carries out data detection of signal sample $S_k$ with respect to a reproduction signal in the data recording area to which waveform equalizing processing is implemented by the FIR equalizer/phase comparator 101.

On the other hand, in the case where time-division control signal DATA-GATE delivered from the PLL controller 18 is DATA-GATE=0, the FIR equalizer/phase comparator 101 is supplied with a coefficient vector as a phase comparator to carry out phase comparing processing of signal sample $S_k$ with respect to a reproduction signal in the clock pattern area. Phase information obtained by the FIR equalizer/phase comparator 101 when the time-division control signal DATA-GATE is DATA-GATE=0 is delivered to digital loop filter 15 through register 102 operative by phase comparison timing signal SAMPLE from the PLL controller 18.

Figure 17:
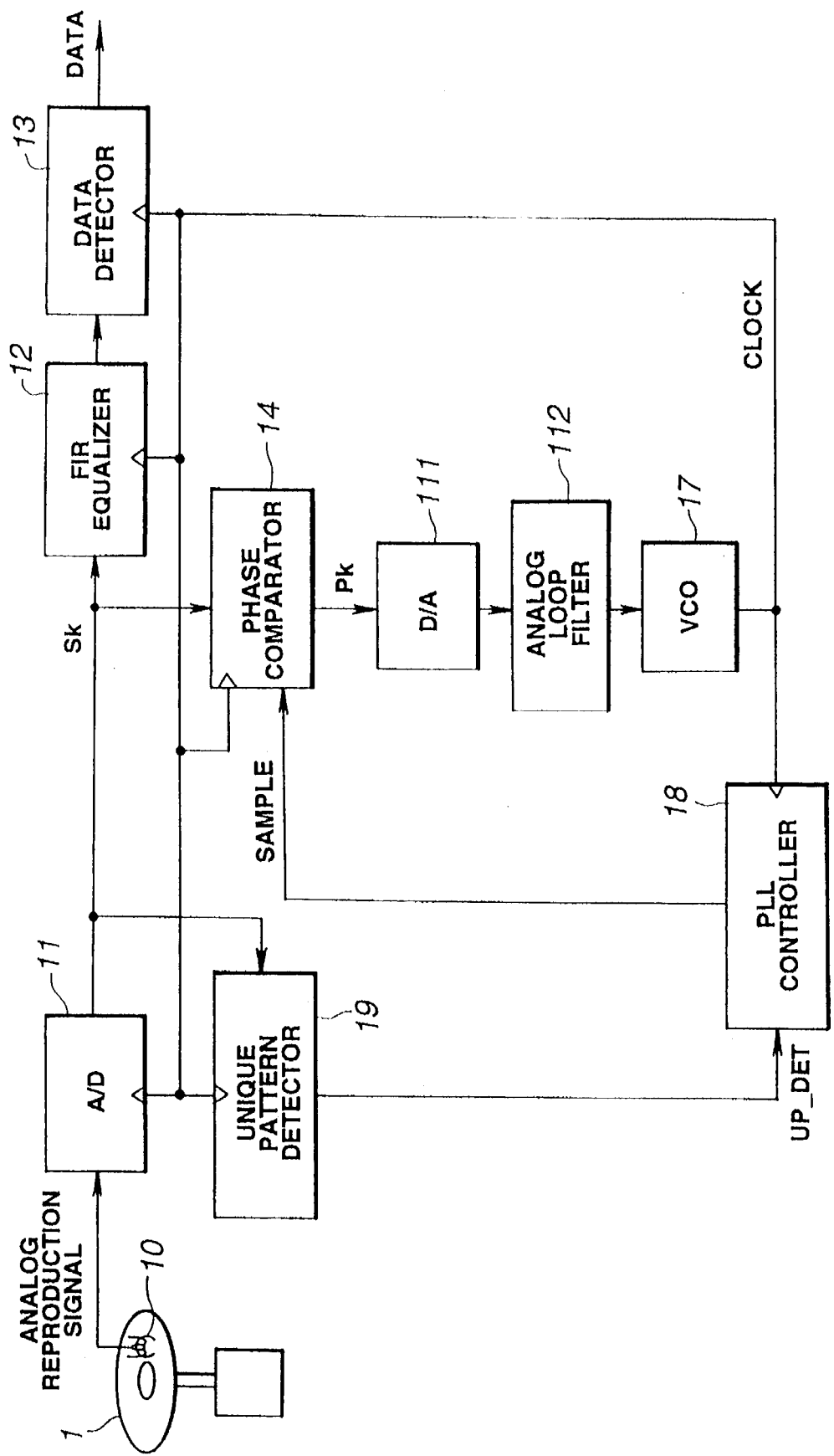
FIG. 17 is a block diagram showing the configuration of a clock reproducing apparatus using an analog filter.

While, in the above-described embodiment, the loop filter of the phase synchronization loop is constituted with digital filter 15, there may be employed, as shown in FIG. 17, for example, a configuration to convert phase information digitally outputted from the phase comparator 14 to an analog signal by using D/A converter 111 to control voltage controlled oscillator 17 through analog loop filter 112.

Figure 18:
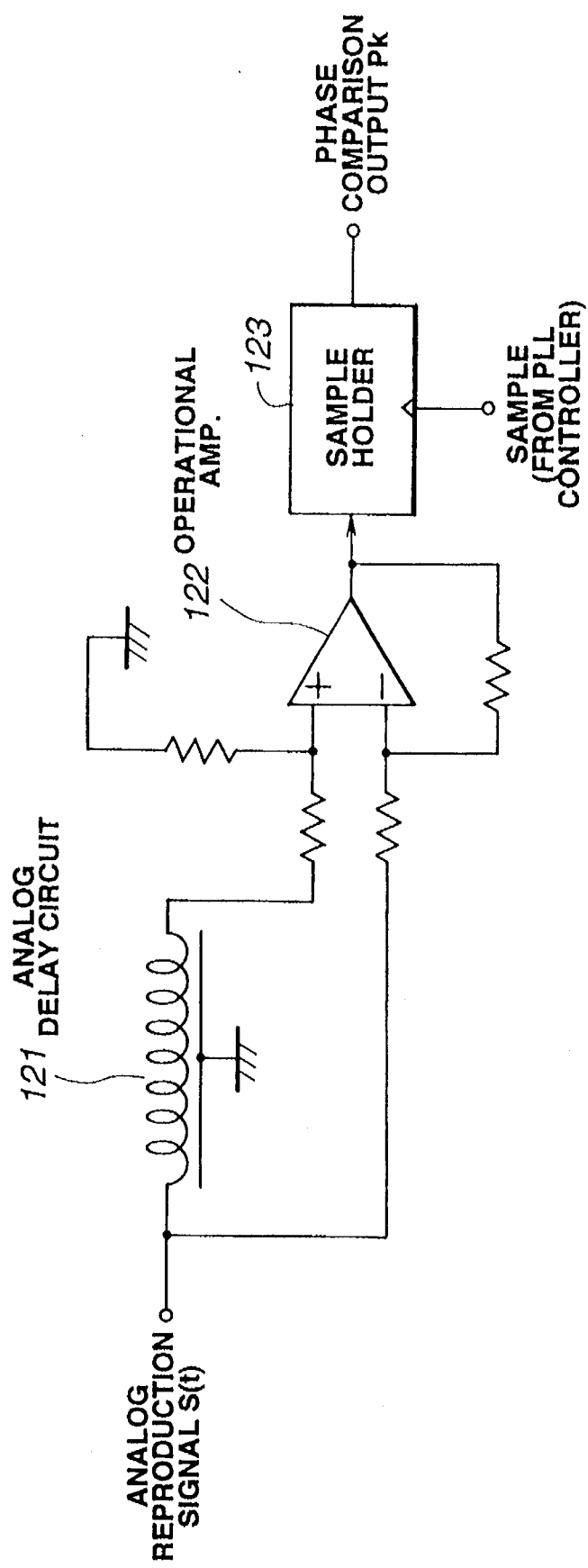
FIG. 18 is a block diagram showing the configuration of the above-mentioned phase comparator shown as an analog circuit structure.

Further, while, in the above-described embodiment, linear combination of a plurality of sample values required for phase comparison is carried out by sampling by A/D converter 11 and digital operation, there may be employed, as shown in FIG. 18, a configuration to calculate linear combinations by analog delay circuit 121 and operational amplifier 122 at all times to sample and hold its output by sample-hold circuit 123 operative by phase comparison timing signal SAMPLE from the PLL controller 18 to thereby obtain phase information.

Figure 19:
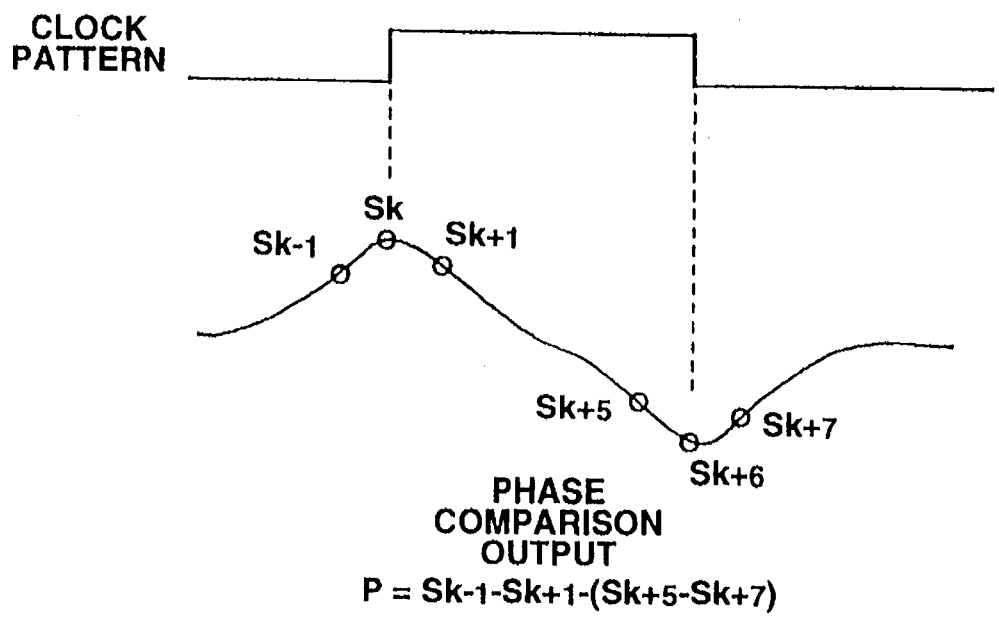
FIG. 19 is a view showing the operation principle of phase comparison using a reproduced waveform from a plurality of pattern edges.

Further, while, in the above-described embodiment, phase comparator 14 is constructed so as to carry out sampling of an isolated reproduced waveform from one edge of the clock pattern 2 thus to obtain phase information, there may be employed, as shown in FIG. 19, a phase comparator 14 of such a structure to carry out sampling and linear combination of reproduced waveforms from two edges before and after the clock pattern 2 to obtain phase information $P=S_{k-1}-S_{k+1}-(S_{k+5}-S_{k+7})$. Thus, phase comparison errors resulting from medium noise or head noise, etc. are averaged, so jitter of the phase comparison output is advantageously reduced. In addition, by carrying out phase comparison of a plurality of isolated reproduced waveforms from a plurality of magnetic clock patterns or other patterns such as a plurality of patterns for servo serving identically thereto, a reduction effect of errors of phase comparison is obtained to more degree.

Figure 20:
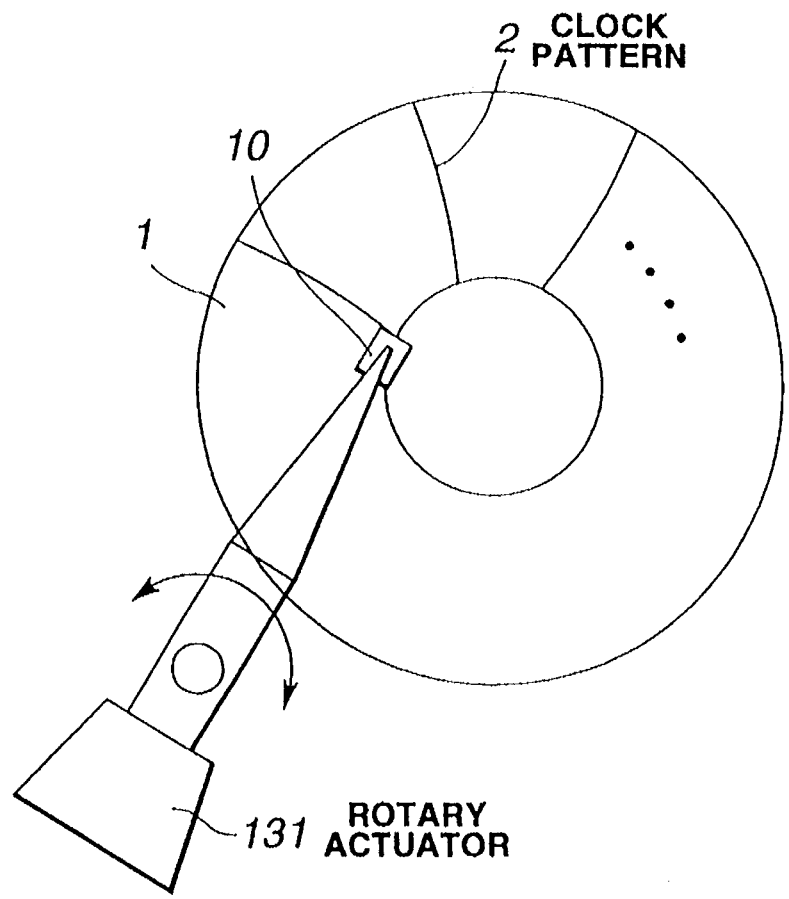
FIG. 20 is a view showing a clock pattern on a magnetic disc in the case where the magnetic head is rotated by rotary actuator.

Further, while, in the above-described embodiment, clock pattern 2 on the magnetic disc 1 is a linear pattern radially formed from the disc rotation center, clock patterns may be formed as shown in FIG. 20 in an arcuated form to traverse concentric or spiral tracks. In this case, magnetic head 10 is adapted so that it is rotated by rotary actuator so as to scan arcuated clock patterns 2 traversing the tracks.

In the case where the head movement mechanism of the magnetic disc apparatus is rotary actuator 131 having one center of rotation, movement locus of the magnetic head 10 is gently arcuate. However, by forming clock patterns 2 in the same arcuate form as that of the head movement locus, azimuth angle with respect to the clock pattern 2 is not varied even if magnetic head 10 is moved. Thus, azimuth loss can be prevented from occurring.

As described above, in accordance with this invention, it is possible to realize phase comparison by a digital circuit. Thus, the clock reproducing circuit system can be digitally implemented except for voltage controlled oscillator, etc. As a result, portions required for adjustment can be reduced and the circuit can become compact by LSI. Further, since phase comparison is carried out by processing a digital signal sample series obtained after having undergone A/D conversion by using digital operation circuit, the main part of the clock reproducing apparatus can be digitally implemented, so the analog circuit portion can be reduced to much degree. Thus, the clock reproducing apparatus can become compact and is adjustment-free. Further, coexistence with other circuit blocks, e.g., equalizer, etc. is facilitated. Furthermore, since the phase comparison characteristic can be easily changed, it becomes easy to adjust the characteristic of the clock reproducing apparatus in accordance with the operating state of the magnetic recording reproducing apparatus.

In addition, when attention is drawn to the configuration adapted to detect data in synchronism with data existing point clock signal reproduced from the system featured as the clock reproducing apparatus, data reproducing apparatus with advantages similar to those of the clock reproducing apparatus mentioned above can be realized.

What is claimed is:

1. A clock reproducing apparatus for generating a data existing point clock signal based on a reproduced waveform obtained by a magnetic head from a magnetic disc on which clock patterns are recorded in servo areas discretely provided independent of data recording areas, said servo areas further including a unique pattern for recognizing an approximate existing time of the clock pattern, which comprises:

voltage controlled oscillating means controlled by a control voltage to oscillate the data existing point clock signal;

means for detecting the unique pattern;

phase synchronization loop control means for generating a phase comparison timing signal a predetermined period after the unique pattern has been detected;

sampling means for sampling the reproduced waveform in synchronism with the data existing point clock signal to generate samples;

phase information generating means comprising:
      means for multiplying each of a plurality of said samples before and after a reference sample value corresponding to a peak of a reproduced waveform by one of a plurality of weighting coefficients, respectively, so as to produce a plurality of weighted samples, said weighting coefficients being independent of the sample values, and
      means for adding said weighted samples together to generate phase information indicating a phase difference between the data existing point clock signal and a reproduction signal of the data existing point clock pattern, said reference sample being selected responsive to said phase comparison timing signal;

and control voltage converting means for converting said phase information to a control voltage for controlling said voltage controlled oscillating means, said voltage controlled oscillating means being operative to output the data existing point clock signal responsive to the control voltage, wherein said oscillating means, said phase information generating means, and said voltage converting means comprise a phase synchronization loop.

2. A clock reproducing apparatus as set forth in claim 1, wherein the phase information generating means weighting-adds a plurality of sample values positioned symmetrically in time relative to the reference sample value to generate phase information.

3. A clock reproducing apparatus as set forth in claim 2, wherein the phase synchronization loop control means further determines whether the unique pattern detection signal is being detected at equal clock intervals and generates a state indication signal indicating that the phase synchronization loop is in the lock state when the unique pattern detection signal is being detected at equal clock intervals, and wherein the phase information generating means comprises a digital delay line with N taps, where N is a positive integer, for outputting a plurality of sample values for carrying out weighting, N coefficient multiplying means, each corresponding to a sample value for multiplying the sample value with a weighting coefficient, said adding means providing a sum total of respective outputs of the coefficient multiplying means, and coefficient supply means for delivering different weighting coefficients to the coefficient multiplying means depending on the state indication signal.

4. A clock reproducing apparatus as set in claim 3, wherein the weighting coefficient is represented as a power of 2 in digital form, and wherein the coefficient multiplying means carries out weighting by bit shifting a value in accordance with the coefficient represented by power of 2.

5. A clock reproducing apparatus as set forth in claim 4, wherein the magnetic disc includes concentric or spiral tracks where data recording areas and servo areas at least including a clock pattern and a unique pattern are formed one after another, and further includes an arcuate servo region traversing the tracks, and wherein the magnetic head is rotationally driven by a rotary actuator so as to scan the arcuate servo area.

6. A clock reproducing apparatus for reproducing a data existing point clock signal by using a reproduction signal obtained by a magnetic head from a magnetic disc on which clock patterns for reproduction of a clock are recorded in servo areas discretely provided independent of data recording areas, wherein a unique pattern for recognizing an approximate existing time of the clock pattern is provided in the servo area of the magnetic disc, said apparatus comprising:

voltage controlled oscillating means controlled by a control voltage to thereby oscillate the data existing point clock signal;

means for detecting the unique pattern;

sampling means for sampling the reproduction signal in synchronism with the data existing point clock signal;

phase information generating means comprising;

means for multiplying a plurality of sample values before and after a reference sample value corresponding to a peak of a reproduced isolated wave form of the clock pattern by one of a plurality of weighting factors, respectively, so as to produce a plurality of weighted samples, said weighting factors being independent of the sample values, and means for adding said weighted samples together to thereby generate phase information indicating a phase difference between the data existing point clock signal and a reproduction signal of the clock pattern;

phase synchronization loop control means for generating a phase comparison timing signal a predetermined time after detection of a unique pattern; and control voltage converting means for converting phase information generated by said phase information generating means to a control voltage for controlling said voltage controlled oscillating means, said voltage controlled oscillating means being operative to output the data existing point clock signal corresponding to a control voltage obtained by said control voltage converting means.

7. A clock reproducing apparatus as set forth in claim 6, wherein said phase information generating means weighting-adds a plurality of sample values positioned symmetrically in point of time relative to the reference sample value to generate phase information.

8. A clock reproducing apparatus as set forth in claim 7, wherein said phase information generating means switches the weighting coefficients in dependency upon whether the phase synchronization loop is in a synchronization capture state or in a lock state to generate the phase information.

9. A clock reproducing apparatus as set forth in claim 8, wherein said phase synchronization loop control means detects whether or not the unique pattern detection signal is detected at equal clock intervals to thereby generate a state indication signal indicating whether or not the phase synchronization loop is in the lock state, and wherein said phase information generating means further comprises a digital delay line with taps for outputting a plurality of sample values for carrying out weighting, said coefficient multiplying means corresponding to the number of sample values, said adding means providing a sum total of respective outputs of said coefficient multiplying means, and coefficient supply means for delivering weighting coefficients corresponding to the state of the phase synchronization loop to the coefficient multiplying means in accordance with the state indication signal from said phase synchronization loop control means.

10. A clock reproducing apparatus as set forth in claim 9, wherein the weighting coefficient is represented by power of 2 in digital form, and wherein said coefficient multiplying means carries out weighting by bit shift of the sample value in accordance with the coefficient represented by power of 2.

11. A clock reproducing apparatus as set forth in claim 10, wherein said magnetic disc includes concentric or spiral tracks where data recording areas and servo areas at least including a clock pattern and unique pattern are formed one after another, and further includes an arcuated servo region traversing across the tracks, and wherein said magnetic head is rotationally driven by a rotary actuator so as to scan the arcuated servo area traversing the tracks.

12. A data reproducing apparatus for generating a data existing point clock signal by using a reproduced waveform obtained by a magnetic head from a magnetic disc on which clock patterns and unique patterns for recognizing an approximate existing time of the clock pattern are recorded in servo areas discretely provided independent of data recording areas, to detect data in synchronism with the data existing point clock signal, which comprises:

voltage controlled oscillating means controlled by a control voltage to oscillate the data existing point clock signal;

reproduction information processing means comprising:

means for multiplying each of a plurality of sample values before and after a reference sample value corresponding to a peak of a reproduced isolated wave form of the clock pattern by one of a plurality of weighting coefficients, respectively, so as to produce a plurality of weighted samples, said weighting coefficients being independent of the sample values, and means for adding said weighted samples together to thereby carry out in a time-division manner, phase information generating processing for generating phase information indicating a phase difference between the data existing point clock signal and a reproduced clock pattern, and equalizing processing means for equalizing a reproduced waveform of data; and control voltage converting means for converting said phase information to a control voltage for controlling said voltage controlled oscillating means;

said voltage controlled oscillating means being operative to output the data existing point clock signal responsive to the control voltage wherein said oscillating means, said reproduction information processing means, and said voltage converting means comprise a phase synchronization loop.

13. A data reproducing apparatus as set forth in claim 12, wherein said reproduction information processing means carries out switching between the phase information generating processing and the equalizing processing in according with a processing timing signal indicating whether the reproduction signal from said magnetic disc is a reproduction signal with respect to the servo area where the clock pattern is recorded or a reproduction signal with respect to the data area where the data is recorded.

14. A data reproducing apparatus as set forth in claim 13, which further comprises:

phase synchronization loop control means for detecting whether or not a unique pattern detection signal indicating that the unique pattern has been detected is detected at equal clock intervals to thereby generate a state indication signal indicating whether the phase synchronization loop is in a lock state, wherein said reproduction information processing means comprises a digital delay line with taps for outputting a plurality of sample values for carrying out weighting or equalizing, said coefficient multiplying means corresponding to the number of the sample values, said adding means providing a sum total of respective outputs of said coefficient multiplying means, and coefficient supply means for delivering, to said coefficient multiplying means, weighting coefficients and equalizing coefficients corresponding to the state of the phase synchronization loop in accordance with the state indication signal from said phase synchronization loop control means and the processing timing signal.

15. A data reproducing apparatus as set forth in claim 14, wherein the equalizing coefficient is a coefficient for carrying out equalization so as to satisfy the Nyquist first criterion.

16. A data reproducing apparatus as set forth in claim 12, wherein the reproduction information processing means carries out switching between the phase information generating processing and the equalizing processing in accordance with a processing timing signal which indicates whether the reproduced waveform corresponds to the servo area or to a data recording area.

17. A data reproducing apparatus as set forth in claim 16, which further comprises:

phase synchronization loop control means for detecting the unique pattern detection signal, determining if the unique pattern is being detected at equal clock intervals, and generating a state indication signal indicating whether the phase synchronization loop is in a lock state, wherein the reproduction information processing means comprises a digital delay line with N taps, where N is a positive integer, for outputting a plurality of sample values for carrying out weighting or equalizing, N coefficient multiplying means corresponding to the number of sample values, said adding means providing a sum total of respective outputs of the coefficient multiplying means, and coefficient supply means for delivering to the coefficient multiplying means different weighting coefficients and equalizing coefficients depending on the state of the phase synchronization loop in accordance with the state indication signal and the processing timing signal.

18. A data reproducing apparatus as set forth in claim 17, wherein the equalizing coefficient is a coefficient for carrying out equalization so as to satisfy Nyquist first criterion.

19. A clock reproducing apparatus for generating a data existing point clock signal based on a reproduced waveform obtained by a magnetic head from a magnetic disc on which clock patterns are recorded in servo areas discretely provided independent of data recording areas, the servo areas further including a unique pattern for recognizing an approximate existing time of the clock pattern, which comprises:

voltage controlled oscillating means controlled by a control voltage to oscillate the data existing point clock signal;

means for detecting the unique pattern;

phase synchronization loop control means adapted to generate a phase comparison timing signal a predetermined period after the unique pattern has been detected;

sampling means for sampling the reproduced waveform in synchronism with the data existing point clock signal to generate samples;

phase information generating means for weighting-adding according to specified weighting coefficients a plurality of the samples before and after a reference sample value corresponding to a peak of a reproduced waveform to generate phase information indicating a phase difference between the data existing point clock signal and a reproduction signal of the data existing point clock pattern, the reference sample being selected responsive to the phase comparison timing signal;

weighting changing means coupled to the phase information generating means for changing the weighting coefficients responsive to a condition of a phase synchronization loop; and control voltage converting means for converting the phase information to a control voltage for controlling the voltage controlled oscillating means, the voltage controlled oscillating means being operative to output the data existing point clock signal responsive to the control voltage wherein said oscillating means, said phase information generating means, and said voltage converting means comprise the phase synchronization loop.

20. A data reproducing apparatus for generating a data existing point clock signal by using a reproduced waveform obtained by a magnetic head from a magnetic disc on which clock patterns and unique patterns for recognizing an approximate existing time of the clock pattern are recorded in servo areas discretely provided independent of data recording areas, to detect data in synchronism with the data existing point clock signal, which comprises:

voltage controlled oscillating means controlled by a control voltage to oscillate the data existing point clock signal;

reproduction information processing means comprising:
means for multiplying each of a plurality of sample values before and after a reference sample value corresponding to a peak of a reproduced isolated wave form of the clock pattern by one of a plurality of weighting coefficients, respectively, so as to produce a plurality of weighted samples, and means for adding said weighted samples together to thereby carry out in a time-division manner, phase information generating processing for generating phase information indicating a phase difference between the data existing point clock signal and a reproduced clock pattern, and equalizing processing means for equalizing a reproduced waveform of data; and control voltage converting means for converting said phase information to a control voltage for controlling said voltage controlled oscillating means;

said voltage controlled oscillating means being operative to output the data existing point clock signal responsive to the control voltage wherein said oscillating means, said reproduction information processing means, and said voltage converting means comprise a phase synchronization loop.

21. A data reproducing apparatus as set forth in claim 20 wherein the reproduction information processing means carries out switching between the phase information generating processing and the equalizing processing in accordance with a processing timing signal which indicates whether the reproduced waveform corresponds to the servo area or to a data recording area.

22. A data reproducing apparatus as set forth in claim 20 which further comprises:

phase synchronization loop control means for detecting the unique pattern detection signal, determining if the unique pattern is being detected at equal clock intervals, and generating a state indication signal indicating whether the phase synchronization loop is in a lock state, wherein the reproduction information processing means comprises a digital delay line with N taps for outputting a plurality of sample values for carrying out weighting or equalizing, N coefficient multiplying means corresponding to the number of sample values, said adding means providing a sum total of respective outputs of the coefficient multiplying means, and coefficient supply means for delivering to the coefficient multiplying means different weighting coefficients and equalizing coefficients depending on the state of the phase synchronization loop in accordance with the state indication signal and the processing timing signal.

23. A data reproducing apparatus as set forth in claim 22 wherein the equalizing coefficient is a coefficient for carrying out equalization so as to satisfy Nyquist first criterion.

* * * * *

UNITED STATES PATENT AND TRADEMARK OFFICE
CERTIFICATE OF CORRECTION

PATENT NO. : 5,526,200
DATED      : June 11, 1996
INVENTOR(S) : Hiroaki Yada

It is certified that error appears in the above-indentified patent and that said Letters Patent is hereby corrected as shown below:

In Col. 14, line 67, after the word "set", insert -- forth --.

In Col. 17, line 6, replace "according" with -- accordance --.

Signed and Sealed this

Twenty-seventh Day of August, 1996

Attest:

BRUCE LEHMAN

Attesting Officer     Commissioner of Patents and Trademarks